United States Patent
Wang et al.

(10) Patent No.: US 11,736,734 B2
(45) Date of Patent: Aug. 22, 2023

(54) CONSTRAINTS ON COLLOCATED PICTURES IN VIDEO CODING

(71) Applicant: Bytedance Inc., Los Angeles, CA (US)

(72) Inventors: Ye-kui Wang, San Diego, CA (US); Li Zhang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 17/957,882

(22) Filed: Sep. 30, 2022

(65) Prior Publication Data
US 2023/0047030 A1  Feb. 16, 2023

Related U.S. Application Data

(63) Continuation of application No. PCT/US2021/024795, filed on Mar. 30, 2021.
(Continued)

(51) Int. Cl.
*H04N 19/33* (2014.01)
*H04N 19/52* (2014.01)
(Continued)

(52) U.S. Cl.
CPC ........... *H04N 19/70* (2014.11); *H04N 19/105* (2014.11); *H04N 19/132* (2014.11);
(Continued)

(58) Field of Classification Search
CPC .. H04N 19/105; H04N 19/132; H04N 19/172; H04N 19/174; H04N 19/33; H04N 19/52; H04N 19/70; H04N 19/96
See application file for complete search history.

(56) References Cited

U.S. PATENT DOCUMENTS

2013/0243092 A1   9/2013   Sugio et al.
2013/0272375 A1   10/2013  Yu
(Continued)

FOREIGN PATENT DOCUMENTS

CN   104322070 A   1/2015
CN   104937939 A   9/2015
(Continued)

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
(Continued)

*Primary Examiner* — Anner N Holder
(74) *Attorney, Agent, or Firm* — Conley Rose, P.C.

(57) ABSTRACT

Methods, devices and systems for video coding and encoding, which include conforming to constraints on collocated pictures, are described. One example method of video processing includes performing a conversion between a video including a current picture and a bitstream of the video, wherein the bitstream conforms to a format rule, and wherein the format rule specifies that the bitstream includes a flag for disabling a use of a temporal motion vector prediction tool for the current picture based on whether a reference picture in a decoded picture buffer has a spatial resolution and a scaling window offset that are identical to that of the current picture.

20 Claims, 17 Drawing Sheets

Related U.S. Application Data

(60) Provisional application No. 63/002,121, filed on Mar. 30, 2020.

(51) Int. Cl.
  *H04N 19/70* (2014.01)
  *H04N 19/96* (2014.01)
  *H04N 19/105* (2014.01)
  *H04N 19/132* (2014.01)
  *H04N 19/172* (2014.01)
  *H04N 19/174* (2014.01)

(52) U.S. Cl.
  CPC ......... *H04N 19/172* (2014.11); *H04N 19/174* (2014.11); *H04N 19/33* (2014.11); *H04N 19/52* (2014.11); *H04N 19/96* (2014.11)

(56) References Cited

U.S. PATENT DOCUMENTS

| | | |
|---|---|---|
| 2014/0016701 A1 | 1/2014 | Chen et al. |
| 2014/0023142 A1 | 1/2014 | Yu et al. |
| 2014/0218473 A1 | 8/2014 | Hannuksela et al. |
| 2015/0016519 A1 | 1/2015 | Xu |
| 2015/0103881 A1 | 4/2015 | Hendry et al. |
| 2015/0201212 A1 | 7/2015 | Zhang et al. |
| 2015/0373350 A1 | 12/2015 | Hendry |
| 2016/0173889 A1 | 6/2016 | Lee et al. |
| 2021/0266600 A1* | 8/2021 | Seregin ................ H04N 19/503 |

FOREIGN PATENT DOCUMENTS

| | | |
|---|---|---|
| CN | 105531999 A | 4/2016 |
| CN | 107079164 A | 8/2017 |
| CN | 109076235 A | 12/2018 |
| WO | 2019182704 A1 | 9/2019 |
| WO | 2020009556 A1 | 1/2020 |

OTHER PUBLICATIONS

"Information technology—High efficiency coding and media delivery in heterogeneous environments—Part 2: High Efficiency Video Coding," ISO/IEC JTC 1/SC 29/WG 11 N 17661, Text of DIS ISO/IEC 23008-2:201x (4th ed.), Apr. 20, 2018, 8 pages.

Document: JVET-G1001-v1, Chen, J., et al., "Algorithm Description of Joint Exploration Test Model 7 (JEM 7)," Joint Video Exploration Team (JVET) of ITU/T SG 16 WP 3 and ISO/IEC JTC 1/SC 29/WG 11 7th Meeting: Torino, IT, Jul. 13-21, 2017, 50 pages.

Document: JVET-Q2002-v3, Chen, J., et al., "Algorithm description for Versatile Video Coding and Test Model 8 (VTM8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., Retrieved from the internet: https://vcgit.hhi.fraunhofer.de/jvet/VVCSoftware_VTM.git, VTM software, Dec. 22, 2022, 3 pages.

Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.

Foreign Communication From A Related Counterpart Application, PCT Application No. PCT/US2021/024795, International Search Report dated Aug. 11, 2021, 19 pages.

Foreign Communication From A Related Counterpart Application, PCT Application No. PCT/US2021/024800, International Search Report dated Jun. 14, 2021, 10 pages.

Document: JVET-Q2001-vD, Bross, B., et al., "Versatile Video Coding (Draft 8)," Joint Video Experts Team (JVET) of ITU-T SG 16 WP 3 and ISO/IEC JTC 1/SC 29/WG11 17th Meeting: Brussels, BE, Jan. 7-17, 2020, 511 pages.

Document: JVET-Q0207, Hendry, et al., "[AHG9]: On signalling of TMVP enabled flag and collocated reference picture," Joint Video Experts Team (JVET) of ITU-T SG 16 WP 3 and ISO/IEC JTC 1/SC 29/WG11 17th Meeting: Brussels, BE, Jan. 7-17, 2020, 7 pages.

\* cited by examiner

1500

Performing a conversion between a video and a bitstream of the video according to a rule, the rule specifying that a flag is included in a sequence parameter set at a position prior to a first syntax element that indicates a number of subpictures included in pictures referring to the sequence parameter set, and a specific value of the flag indicating that the pictures include exactly one slice — 1510

FIG. 15

CONSTRAINTS ON COLLOCATED PICTURES IN VIDEO CODING

CROSS-REFERENCE TO RELATED APPLICATION

This application is a continuation of International Patent Application No. PCT/US2021/024795, filed on Mar. 30, 2021, which claims the priority to and benefits of U.S. Provisional Patent Application No. 63/002,121 filed on Mar. 30, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for video encoding or decoding, and includes constraints on collocated pictures.

In one example aspect, a video processing method is disclosed. The method includes performing a conversion between a video comprising a current picture and a bitstream of the video, wherein the bitstream conforms to a format rule, and wherein the format rule specifies that the bitstream comprises a flag for disabling a use of a temporal motion vector prediction tool for the current picture based on whether a reference picture in a decoded picture buffer has a spatial resolution and a scaling window offset that are identical to that of the current picture.

In another example aspect, a video processing method is disclosed. The method includes performing a conversion between a video comprising a current picture and a bitstream of the video, wherein the bitstream conforms to a format rule, and wherein the format rule specifies that a collocated picture of the current picture is permitted to be included in a first reference picture list for the current picture irrespective of whether the current picture includes a predictively coded slice (P slice).

In yet another example aspect, a video processing method is disclosed. The method includes performing a conversion between a video comprising a current picture comprising a slice and a bitstream of the video, wherein the bitstream conforms to a format rule, wherein the format rule specifies that a reference index of a collocated picture of the current picture is derived based on reference picture list information signaled in a picture header associated with the current picture and a reference picture list X that comprises the collocated picture, and wherein X is an integer that equals zero or one.

In yet another example aspect, a video processing method is disclosed. The method includes performing a conversion between a video comprising a current picture that includes a slice and a bitstream of the video, wherein the bitstream conforms to a format rule that specifies that a slice header associated with the slice comprises one or more constraints on a collocated picture, and wherein the one or more constraints specifies that a variable indicating that a reference picture resampling process is disabled for the collocated picture.

In yet another example aspect, a video processing method is disclosed. The method includes performing a conversion between a video comprising a current picture and a bitstream of the video, wherein the bitstream conforms to a format rule, and wherein the format rule specifies that a constraint on an index in a picture header associated with the current picture such that the index is required to be greater than or equal to zero and less than a number of active reference indices applicable to the current picture.

In yet another example aspect, a video processing method is disclosed. The method includes performing a conversion between a video and a bitstream of the video according to a rule, wherein the rule specifies that a flag is included in a sequence parameter set at a position prior to a first syntax element that indicates a number of subpictures included in pictures referring to the sequence parameter set, and wherein a specific value of the flag indicates that the pictures include exactly one slice.

In yet another example aspect, a video processing method is disclosed. The method includes performing a conversion between a video and a bitstream of the video according to a rule, wherein the rule specifies that a flag is included in a picture parameter set at a position prior to a first syntax element that indicates a number of subpictures included in pictures referring to the picture parameter set, and wherein a specific value of the flag indicates that the pictures include exactly one slice.

In yet another example aspect, a video processing method is disclosed. The method includes performing a conversion between a video comprising a current picture and a bitstream of the video, wherein the bitstream conforms to a format rule, and wherein the format rule specifies that a picture header associated with the current picture comprises a syntax element that signals an applicability of one of three modes of a luma mapping with chroma scaling (LMCS) coding tool to the picture: (a) disabled, (b) used for all slices, or (c) enabled.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present document.

BRIEF DESCRIPTION OF DRAWINGS

FIGS. 10-17 show flowcharts for example methods of video processing.

DETAILED DESCRIPTION

Figure 1:
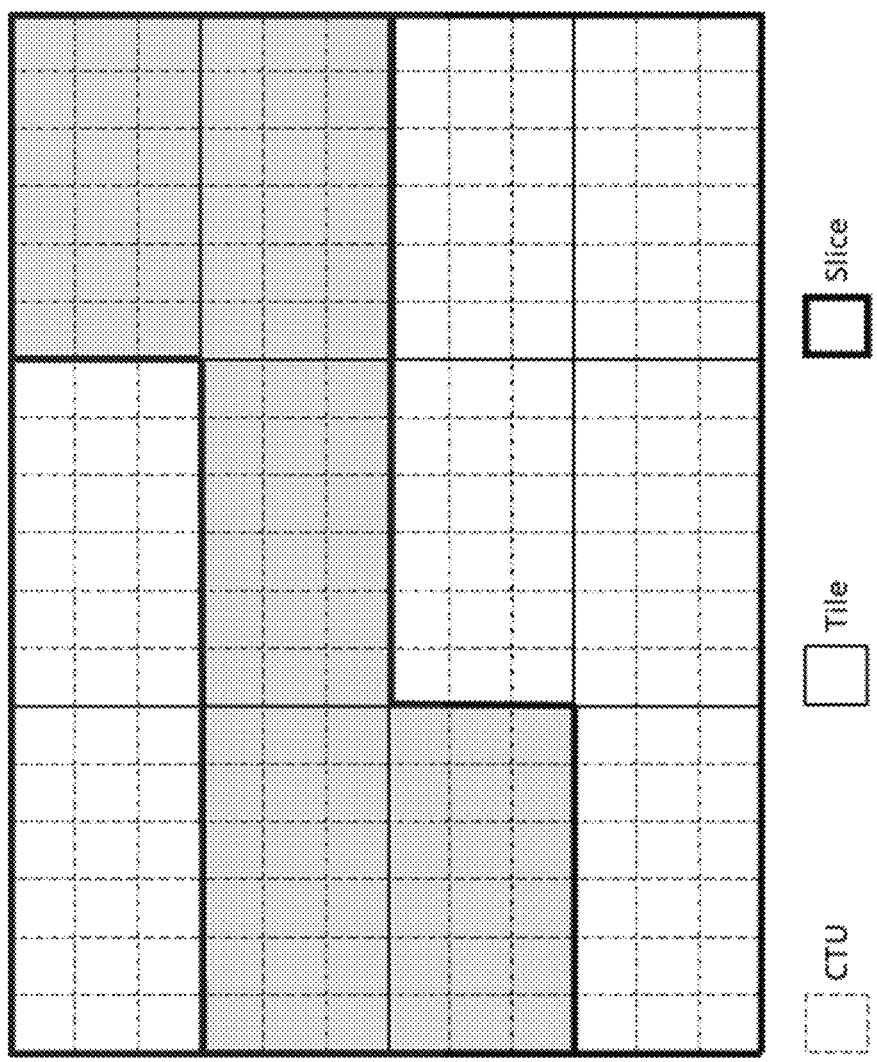
FIG. 1 shows an example of partitioning a picture with luma coding tree units (CTUs).

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Introduction

This document is related to video coding technologies. Specifically, it is about signaling of subpictures, tiles, and slices. The ideas may be applied individually or in various combination, to any video coding standard or non-standard video codec that supports multi-layer video coding, e.g., the being-developed Versatile Video Coding (VVC).

2. Abbreviations

ALF Adaptive Loop Filter
APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
LMCS Luma Mapping with Chroma Scaling
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RADL Random Access Decodable Leading (Picture)
RAP Random Access Point
RASL Random Access Skipped Leading (Picture)
RBSP Raw Byte Sequence Payload
RPL Reference Picture List
SAO Sample Adaptive Offset
SEI Supplemental Enhancement Information
SPS Sequence Parameter Set
STSA Step-wise Temporal Sublayer Access
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion, Final Draft International Standard (FDIS), at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own network abstraction layer (NAL) unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y. K. Wang (editors), "HEVC Additional Supplemental Enhancement Information (Draft 4)," Oct. 24, 2017, publicly available herein: http://phenix. int-evry.fr/jct/doc_end_user/documents/29_Macau/wg11/JCTVC-AC1005-v2. zip. With this amendment included, HEVC specifies three motion constrained tile set (MCTS)-related supplemental enhancement information (SEI) messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing raw byte sequence payload (RBSP) bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment in_pic_flag and slice_segment_address) typically would need to have different values.

3.2. Partitioning of Pictures in VVC

In VVC, A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

FIG. 1 shows an example of raster-scan slice partitioning of a picture, where the picture is divided into 12 tiles and 3 raster-scan slices.

Figure 2:
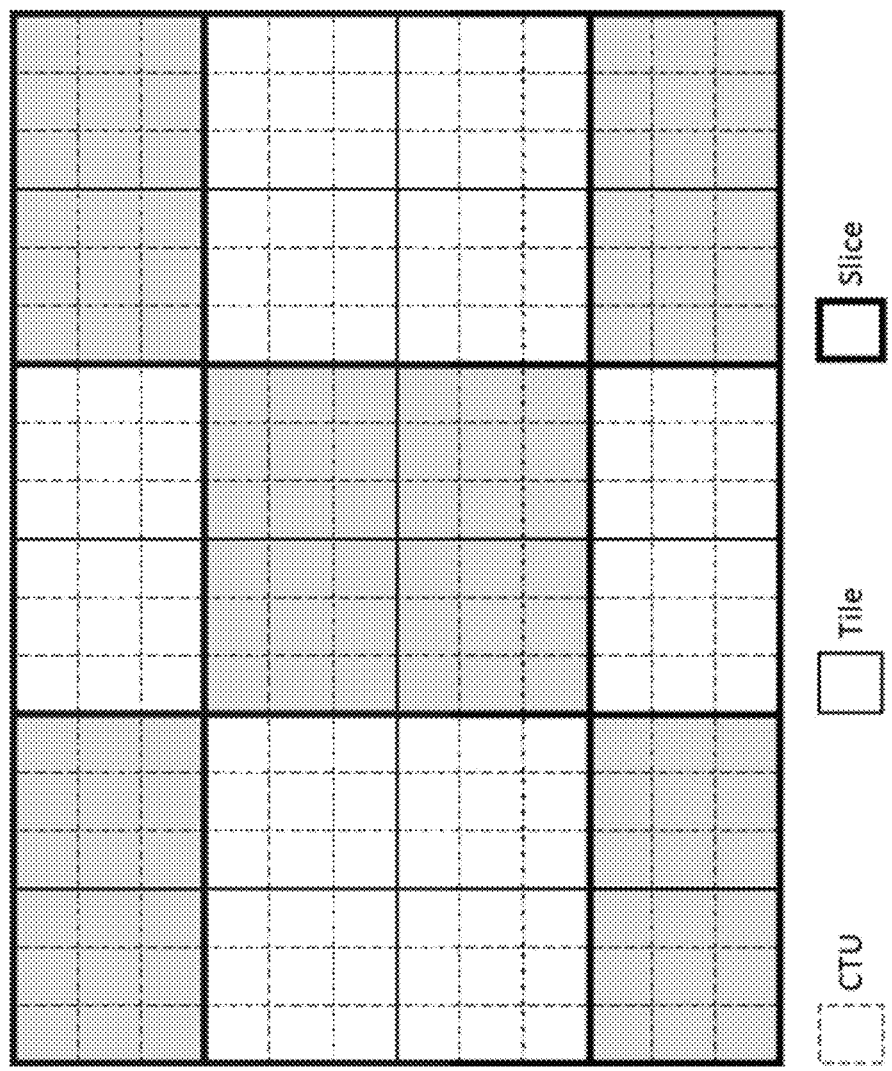
FIG. 2 shows another example of partitioning a picture with luma CTUs.

FIG. 2 shows an example of rectangular slice partitioning of a picture, where the picture is divided into 24 tiles (6 tile columns and 4 tile rows) and 9 rectangular slices.

Figure 3:
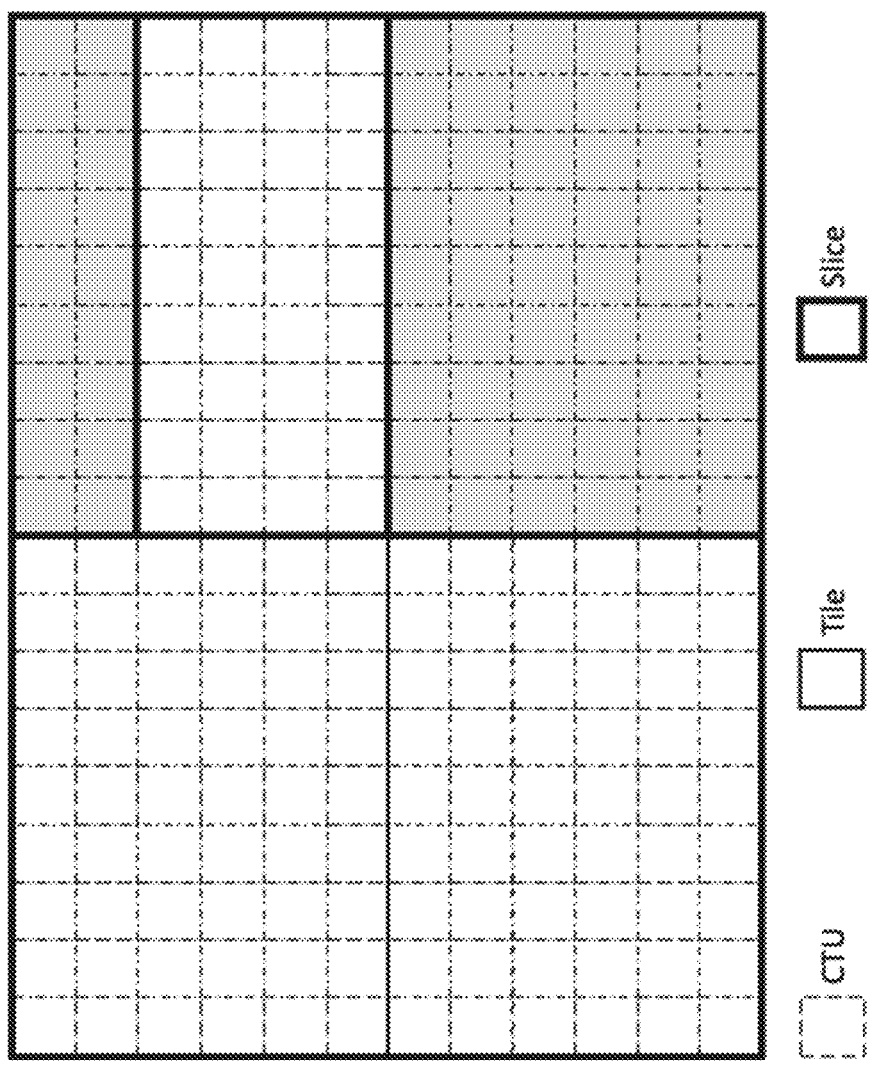
FIG. 3 shows an example partitioning of a picture.

FIG. 3 shows an example of a picture partitioned into tiles and rectangular slices, where the picture is divided into 4 tiles (2 tile columns and 2 tile rows) and 4 rectangular slices.

Figure 4:
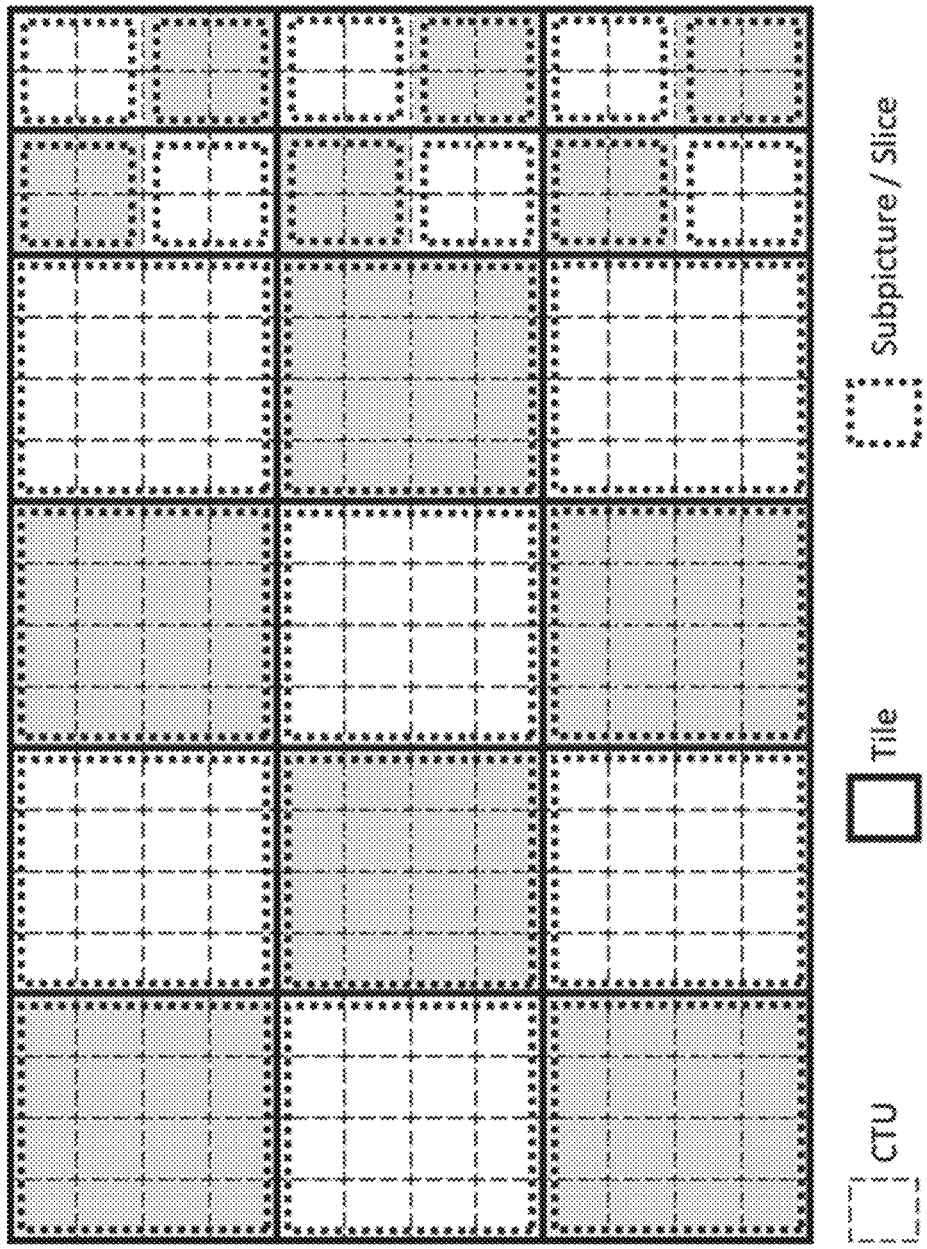
FIG. 4 shows another example partitioning of a picture.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Picture Resolution Change within a Sequence

In AVC and HEVC, the spatial resolution of pictures cannot change unless a new sequence using a new SPS starts, with an intra random access picture (TRAP) picture. VVC enables picture resolution change within a sequence at a position without encoding an TRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.4. Reference Picture Management and Reference Picture Lists (RPLs)

Reference picture management is a core functionality that is necessary for any video coding scheme that uses inter prediction. It manages the storage and removal of reference pictures into and from a decoded picture buffer (DPB) and puts reference pictures in their proper order in the RPLs.

The reference picture management of HEVC, including reference picture marking and removal from the decoded picture buffer (DPB) as well as reference picture list construction (RPLC), differs from that of AVC. Instead of the reference picture marking mechanism based on a sliding window plus adaptive memory management control operation (MMCO) in AVC, HEVC specifies a reference picture management and marking mechanism based on so-called reference picture set (RPS), and the RPLC is consequently based on the RPS mechanism. An RPS consists of a set of reference pictures associated with a picture, consisting of all reference pictures that are prior to the associated picture in decoding order, that may be used for inter prediction of the associated picture or any picture following the associated picture in decoding order. The reference picture set consists of five lists of reference pictures. The first three lists contain all reference pictures that may be used in inter prediction of the current picture and that may be used in inter prediction of one or more of the pictures following the current picture in decoding order. The other two lists consist of all reference pictures that are not used in inter prediction of the current picture but may be used in inter prediction of one or more of the pictures following the current picture in decoding order. RPS provides an "intra-coded" signaling of the DPB status, instead of an "inter-coded" signaling as in AVC, mainly for improved error resilience. The RPLC process in HEVC is based on the RPS, by signaling an index to an RPS subset for each reference index; this process is simpler than the RPLC process in AVC.

Reference picture management in VVC is more similar to HEVC than AVC, but is somewhat simpler and more robust. As in those standards, two RPLs, list 0 and list 1, are derived, but they are not based on the reference picture set concept used in HEVC or the automatic sliding window process used in AVC; instead they are signaled more directly. Reference pictures are listed for the RPLs as either active and inactive entries, and only the active entries may be used as reference indices in inter prediction of CTUs of the current picture. Inactive entries indicate other pictures to be held in the DPB for referencing by other pictures that arrive later in the bitstream.

3.5. Parameter Sets

AVC, HEVC, and VVC specify parameter sets. The types of parameter sets include sequence parameter set (SPS), picture parameter set (PPS), adaptation parameter set (APS), and video parameter set (VPS). SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.6. Slice Header and Picture Header in VVC

Similarly as in HEVC, the slice header in VVC conveys information for a particular slice. This includes slice address, slice type, slice quantization parameter (QP), picture order count (POC) least significant bits (LSBs), RPS and RPL information, weighted prediction parameters, loop filtering parameters, entry offsets of tiles and WPP, etc.

VVC introduced the picture header (PH), which contains header parameters for a particular picture. Each picture must have one or only one PH. The PH basically carries those parameters that would have been in the slice header if PH were not introduced but each has the same value for all slices of a picture. These include IRAP/gradual decoding refresh (GDR) picture indications, inter/intra slices allowed flags, POC LSB and optionally POC most significant bit (MSB), information on RPLs, deblocking, sample adaptive offset (SAO), adaptive loop filter (ALF), QP delta, and weighted prediction, coding block partitioning information, virtual boundaries, co-located picture information, etc. It often occurs that each picture in an entire sequence of pictures contains only one slice. To allow not to have at least two NAL units for each picture in such cases, the PH syntax structure is allowed to be included either the PH NAL unit or in the slice header.

In VVC, information on the collocated picture, which is used for temporal motion vector prediction, is signalled either in the picture header or the slice header.

3.7. Luma Mapping with Chroma Scaling (LMCS)

Unlike other in-loop filters (i.e., deblocking, SAO, and ALF), which in general apply filtering processes for a current sample by using the information of its spatial neighboring samples to reduce the coding artifacts, the luma mapping with chroma scaling (LMCS) modifies the input signal before encoding by redistributing the codewords across the entire dynamic range to improve compression efficiency. LMCS has two main components: (a) in-loop mapping of the luma component based on adaptive piecewise linear models, and (b), luma-dependent chroma residual scaling for the chroma components. Luma mapping makes use of a forward mapping function, FwdMap, and a corresponding inverse mapping function, InvMap. The FwdMap function is signaled using a piecewise linear model with 16 equal pieces. InvMap function does not need to be signaled and is instead derived from the FwdMap function. The luma mapping model is signaled in the APS. Up to 4 LMCS APSs can be used in a coded video sequence. When LMCS is enabled for a picture, an APS ID is signaled in the picture header to identify the APS that carries the luma mapping parameters. When LMCS is enabled for a slice, the InvMap function is applied to all the reconstructed luma blocks to convert the samples back to the original domain. For an inter coded block, an additional mapping process is needed, which is applying the FwdMap function to map the luma prediction block in the original domain to the mapped domain after the normal compensation process. Chroma residual scaling is designed to compensate for the interaction between the luma signal and its corresponding chroma signals. When luma mapping is enabled, an additional flag is signaled to indicate whether luma-dependent chroma residual scaling is enabled or not. The chroma residual scaling factor depends on the average value of top and/or left reconstructed neighboring luma samples of the current coding unit (CU). Once the scaling factor is determined, the forward scaling is applied to both the intra and inter predicted residual at the encoding stage, and the inverse scaling is applied to the reconstructed residual.

4. Examples of Technical Problems Solved by Solutions Herein

The existing design in the latest VVC text (in JVET-Q2001-vE/v15) has the following problems:
1) The signalling of the collocated picture includes whether it is from list 0 or list 1, and the reference index. Currently, the signalling of the collocated picture going together with the RPL information, either in the PH or in the SH (but never both).
   When ph_temporal_mvp_enabled_flag and rpl_info_in_ph_flag are both equal to 1, the value of slice_collocated_from_l0_flag would be inferred to be equal to ph_collocated_from_l0 flag, as follows:
   When slice_type is equal to B or P, ph_temporal_mvp_enabled_flag is equal to 1, and slice_collocated_from_l0_flag is not present, the following applies:
   If rpl_info_in_ph_flag is equal to 1, slice_collocated_from_l0_flag is inferred to be equal to ph_collocated_from_l0_flag.
   Otherwise (rpl_info_in_ph_flag is equal to 0 and slice_type is equal to P), the value of slice_collocated_from_l0_flag is inferred to be equal to 1.
   Consequently, when ph_temporal_mvp_enabled_flag and rpl_info_in_ph_flag are both equal to 1, and ph_collocated_from_l0_flag is equal to 0, the value of slice_collocated_from_l0_flag is inferred to be equal to 0, including for P slices in the picture. However, a P slice shall only refer to entries in list 0.
2) The existing constraint on the value of ph_temporal_mvp_enabled_flag, copied below, is not really needed, as what is prohibited is later disallowed by the SH constraint (also copied below) on the collocated picture to have the same resolution and the same scaling window offsets.
   When no reference picture in the DPB has the same spatial resolution as the current picture, the value of ph_temporal_mvp_enabled_flag shall be equal to 0.
   It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag?0:1][slice_collocated_ref_idx] shall be equal to 0.
3) The SH constraint (copied above) on the collocated picture to have the same resolution and the same scaling window offsets has some redundance, as the 0-valued RprConstraintsActive[ ][ ] aspect covers both the same resolution aspect and the same scaling window offsets aspect. Therefore, the same resolution aspect can be removed.
4) When the value of NumRefIdxActive[0] is known when parsing the PH, the value range currently specified for ph_collocated_ref_idx is not optimal.

5) In the latest VVC draft text, for any picture in a coded layer video sequence (CLVS), if the PH syntax structure is included in the SH instead of in a PH NAL unit, then each picture in the CLVS has only one slice and the PH syntax structure for each picture in the CLVS is included in the SH instead of in a PH NAL unit. This design was included for a major use case where pictures are not split into multiple slices and each picture can be represented with just one NAL unit (instead of two NAL units, one for the PH and one for the slice). It is possible to have a flag in the SPS to specify that the pictures in the CLVS each has only one slice. However, there lacks a mechanism to skip the signalling of some syntax elements (e.g., sps_num_subpics_minus1 and sps_independent_subpics_flag) in the SPS based on the value of such an SPS flag.
6) Similarly as in item 5, it is possible to have a flag in the PPS to specify that the picture has only one slice. However, there lacks a mechanism to skip the signalling of one or more of the PPS syntax elements pps_num_subpics_minus1, rect_slice_flag, single_slice_per_subpic_flag, num_slices_in_pic_minus1, and loop_filter_across_slices_enabled_flag based on the value of such a PPS flag.
7) The LMCS signalling is inefficient. When ph_lmcs_enabled_flag is equal to 1, in most cases LMCS would be enabled for all slices of the picture. However, in the current VVC design, for the case when LMCS is enabled for all slices of a picture, not only ph_lmcs_enabled_flag is equal to 1, the slice_lmcs_enabled_flag with value 1 needs to be signalled for each slice.
   a. The semantics of ph_lmcs_enabled_flag is conflicting with the motivation of signalling slice level LMCS flag when ph_lmcs_enabled_flag is true. In current VVC, when ph_lmcs_enabled_flag is true, it means all slices shall enable LMCS. Therefore, there is no need to further signal LMCS enabling flags in slice header.
   b. In addition, when the picture header tells LMCS is enabled, typically, for all slices, LMCS are all enabled. The controlling of LMCS in slice header is mainly for handling corner cases. Therefore, if the PH LMCS flag is true and SH LMCS flag is always signalled, which may result in unnecessary bits signalled for common user cases.
   c. Furthermore, the enabling/disabling of chroma residual scaling for a picture and/or slice is not clearly specified in the semantics of ph_chroma_residual_scale_flag and slice_lmcs_enabled_flag.

5. Example Techniques and Embodiments

To solve the above problems, and others, methods as summarized below are disclosed. The aspects should be considered as examples to explain the general concepts and should not be interpreted in a narrow way. Furthermore, these examples can be applied individually or combined in any manner.
1) To solve problem 1, one or more of the following methods may be applied:
   a. The collocated picture may be allowed to be from reference picture list 1 (and possibly not present in reference picture list 0) regardless of whether the picture contains P slices or not.
      i. Alternatively, furthermore, the following changes are introduced as text in boldface italics, and deletions are shown using bolded double brackets: When decoding a P slice, [[only]] reference picture list 0 (i.e., RefPicList[0]) is used in decoding of the slice data, *and motion information of reference pictures in reference picture list 1 (i.e., RefPicList[ 1 ]) may be used in decoding of the slice data*.
      ii. Alternatively, furthermore, the following changes are introduced as text in boldface italics, and deletions are shown using bolded double brackets: When decoding a P slice, [[only]] reference picture list 0 (i.e., RefPicList[0]) is used in decoding of the slice data, *and motion information of one reference picture in reference picture list 1 (i.e., RefPicList[ 1 ]) may be used in decoding of the slice data*.
   b. When the RPL information is signalled in the PH (i.e., rpl_info_in_ph_flag is equal to 1), ph_collocated_from_l0_flag is equal to 0 (i.e., the collocated picture is from reference picture list 1), the slice collocated picture reference index (i.e., slice_collocated_ref_idx) may be derived to be equal to Min (ph_collocated_ref_idx, NumRefIdxActive[0]-1).
      i. Alternatively, in this case slice_collocated_ref_idx may be derived to be equal to (ph_collocated_ref_idx<NumRefIdxActive[0])?ph_collocated_ref_idx: N, wherein N is a variable which is in the range of 0 to NumRefIdxActive[0]-1, inclusive.
         1. In one example, N is set to 0.
2) To solve problem 2, it is proposed to replace the constraint on the value of ph_temporal_mvp_enabled_flag with the following NOTE:
   NOTE—The value of ph_temporal_mvp_enabled_flag has to be equal to 0 when no reference picture in the DPB has the same spatial resolution and scaling window offsets as the current picture.
   a. Alternatively, it is proposed to just add the same-scaling-window-offsets aspect into the existing constraint, i.e., change the constraint to be as follows: When no reference picture in the DPB has the same spatial resolution and the same scaling window offsets as the current picture, the value of ph_temporal_mvp_enabled_flag shall be equal to 0.
3) To solve problem 3, in the SH constraint on the collocated picture to have the same resolution and the same scaling window offsets, remove the same-resolution aspect, just keep the 0-valued-RprConstraintsActive[ ][ ] aspect.
4) To solve problem 4, one or both of the following applies:
   a. When the value of NumRefIdxActive[ 0] is known when parsing the PH and ph_collocated_from_l0_flag is equal to 1, the value of ph_collocated_ref_idx may be restricted to be in the range of 0 to NumRefIdxActive[0]-1, inclusive.
   b. When the value of NumRefIdxActive[1] is known when parsing the PH and ph_collocated_from_l0_flag is equal to 0, the value of ph_collocated_ref_idx may be restricted to be in the range of 0 to NumRefIdxActive[1]-1, inclusive.
5) To solve problem 5, an SPS flag, e.g., sps_one_slice_per_picture_flag, may be signalled in the SPS at a position before the syntax element sps_num_subpics_minus1, and sps_one_slice_per_picture_flag equal to 1 specifies that each picture referring to the SPS contains only one slice.
   a. Furthermore, when sps_one_slice_per_picture_flag is equal to 1, the signalling of either or both of the SPS syntax elements sps_num_subpics_minus1 and sps_independent_subpics_flag may be skipped.

i. Furthermore, when sps_one_slice_per_picture_flag is equal to 1, the values of either or both of sps_num_subpics_minus1 and sps_independent_subpics_flag may be inferred to be equal to 0 and 1, respectively.
b. Alternatively, furthermore, when sps_one_slice_per_picture_flag is equal to 1, the values of either or both of the SPS syntax elements sps_num_subpics_minus1 and sps_independent_subpics_flag are constrained to be equal to 0 and 1, respectively.
c. Furthermore, it may be required that, when sps_one_slice_per_picture_flag is equal to 1, the value of picture_header_in_slice_header_flag shall be equal to 1.
d. Alternatively, furthermore, when a constraint that each picture shall contain only one slice is true (e.g., one_slice_per_pic_constraint_flag is equal to 1), it is required that the SPS flag shall be equal to 1.
6) To solve problem 6, a PPS flag, e.g., pps_one_slice_per_picture_flag, may be signalled in the PPS at a position before the syntax element pps_num_subpics_minus1, and pps_one_slice_per_picture_flag equal to 1 specifies that each picture referring to the PPS contains only one slice.
a. Furthermore, when pps_one_slice_per_picture_flag is equal to 1, the signalling of one or more of the PPS syntax elements pps_num_subpics_minus1, rect_slice_flag, single_slice_per_subpic_flag, num_slices_in_pic_minus1, and loop_filter_across_slices_enabled_flag may be skipped.
i. Furthermore, when pps_one_slice_per_picture_flag is equal to 1, the values of one or more of pps_num_subpics_minus1, rect_slice_flag, single_slice_per_subpic_flag, num_slices_in_pic_minus1, and loop_filter_across_slices_enabled_flag may be inferred to be equal to 0, 1, 1, 1, and 1, respectively.
b. Alternatively, furthermore, when pps_one_slice_per_picture_flag is equal to 1, the values of one or more of pps_num_subpics_minus1, rect_slice_flag, single_slice_per_subpic_flag, num_slices_in_pic_minus1, and loop_filter_across_slices_enabled_flag are constrained to be equal to 0, 1, 1, 1, and 1, respectively.
c. Alternatively, furthermore, when a constraint that each picture shall contain only one slice is true (e.g., one_slice_per_pic_constraint_flag is equal to 1), it is required that the PPS flag shall be equal to 1.
7) To solve problem 7 and its sub-problems, the PH_flag_ph_lmcs_enabled_flag may be replaced with a 2-bit ph_lmcs_mode_idc, which specifies 3 modes: disabled (mode 0), used for all slices (mode 1), and enabled (mode 2). In mode 1, LMCS is used for all slices of a picture, and no LMCS controlling information is needed in the SH.
a. Alternatively, furthermore, the semantics of LMCS SH control flag (e.g., slice_lmcs_used_flag) is revised to indicate LMCS is used or not.
Alternatively, furthermore, fixes of the semantics of ph_chroma_residual_scale_flag and are made to correctly describe the enabling/disabling of chroma residual scaling for a picture and/or slice, as described in section 6.3.

6. Embodiments

Below are some example embodiments for all the aspects except item 8 summarized above in Section 5, which can be applied to the VVC specification. The changed texts are based on the latest VVC text in JVET-P2001-v14. Most relevant parts that have been added or modified are shown in _underline_ , _bolded and italicized text_ , and the most relevant removed parts are highlighted in enclosed in bolded double brackets, e.g., [[a]] indicates that "a" has been removed. There are some other changes that are editorial in nature and thus not highlighted.

6.1. First Embodiment

This embodiment corresponds to Examples 2-4 described above.

7.4.3.7 Picture Header Structure Semantics pic_output_flag affects the decoded picture output and removal processes as specified in Annex C. When pic_output_flag is not present, it is inferred to be equal to 1.

_When rpl_info_in_ph _flag is equal to 1,_
_for i in the range of 0 to 1, inclusive, the value of_
_NumRefIdxActive[ i ] is derived to be equal to_
_num_ref_idx_default_ active_minus1[ i ] + 1 ._ ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. [[When no reference picture in the DPB has the same spatial resolution as the current picture, the value of ph_temporal_mvp_enabled_flag shall be equal to 0.]]

*NOTE - The value of ph_temporal_*
*mvp_enabled_flag has to*
*be equal to 0 when no reference*
*picture in the DPB has the same*
*spatial resolution and scaling*
*window offsets as the current picture .* ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

ph_collocated_ref_idx specifies the reference index of the collocated picture used for temporal motion vector prediction.

When ph_collocated_from_l0_flag is equal to 1, ph_collocated_ref_idx refers to an entry in reference picture list 0, and the value of ph_collocated_ref_idx shall be in the range of 0 to [[num_ref_entries[0][RplsIdx[0]]]] _NumRefIdxActive[ 0 ]_ -1, inclusive.

When ph_collocated_from_l0_flag is equal to 0, ph_collocated_ref_idx refers to an entry in reference picture list 1, and the value of ph_collocated_ref_idx shall be in the range of 0 to [[num_ref_entries[1][RplsIdx[1]]]] _NumRefIdxActive[ 1 ]_ -1, inclusive.

When not present, the value of ph_collocated_ref_idx is inferred to be equal to 0.

7.4.8.1 General Slice Header Semantics slice_collocated_ref_idx specifies the reference index of the collocated picture used for temporal motion vector prediction.

When slice_type is equal to P or when slice type is equal to B and slice_collocated_from_l0_flag is equal to 1, slice_collocated_ref_idx refers to an entry in reference picture list 0, and the value of slice_collocated_ref_idx shall be in the range of 0 to NumRefIdxActive[0]-1, inclusive.

When slice_type is equal to B and slice_collocated_from_l0_flag is equal to 0, slice_collocated_ref_idx refers to an entry in reference picture list 1, and the value of slice_collocated_ref_idx shall be in the range of 0 to NumRefIdxActive[1]-1, inclusive.

When slice_collocated_ref_idx is not present, the following applies:
   If rpl_info_in_ph_flag is equal to 1, the value of slice_collocated_ref_idx is inferred to be equal to ph_collocated_ref_idx.
   Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that [[the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and]] RprConstraintsActive[slice_collocated_from_l0_flag?0:1][slice_collocated_ref_idx] shall be equal to 0.
   *NOTE - The above constraint*
   *requires the collocated picture*
   *to have the same spatial resolution and*
   *scaling window offsets as the current picture .*

6.2. Second Embodiment

This embodiment corresponds to Examples 5-6 described above.

7.3.2.3 Sequence Parameter Set RBSP Syntax

| seq_parameter_set_rbsp( ) { | Descriptor |
| --- | --- |
| ... | |
| sps_log2_ctu_size_minus5 | u(2) |
| *sps_one_slice_per_picture_flag* | *u(1)* |
| subpic_info_present_flag | u(1) |
| if( subpic_info_present_flag ) { | |
|    *if( !sps_one_slice_per_picture_flag ) {* | |
|       sps_num_subpics_minus1 | ue(v) |
|       sps_independent_subpics_flag | u(1) |
|    } | |
| ... | |

7.4.3.3 Sequence Parameter Set RBSP Semantics sps_log 2_ctu_size_minus5 plus 5 specifies the luma coding tree block size of each CTU. The value of sps_log 2_ctu_size_minus5 shall be in the range of 0 to 2, inclusive. The value 3 for sps_log 2_ctu_size_minus5 is reserved for future use by ITU-T|ISO/IEC.

The variables CtbLog 2SizeY and CtbSizeY are derived as follows:

$$Ctb\ Log\ 2SizeY = sps\_log\ 2\_ctu\_size\_minus5 + 5 \quad (43)$$

$$CtbSizeY = 1 << Ctb\ Log\ 2SizeY \quad (44)$$

*sps_one_slice_per_picture_flag equal to 1 specifies that each picture in the CLVS has only one slice sps_one_slice_per_picture_flag equal to 0 specifies that each picture in the CLVS may have one or more slices .*

*When one_slice_per_pic_ constraint_flag is equal to 1, the value of sps_one_slice_ per_picture_flag shall be equal to 1.*

When one_slice_per_pic_constraint_flag is equal to 1, the value of sps_one_slice_per_picture_flag shall be equal to 1.

subpic_info_present_flag equal to 1 specifies that subpicture information is present for the CLVS and there may be one or more than one subpicture in each picture of the CLVS. subpic_info_present_flag equal to 0 specifies that subpicture information is not present for the CLVS and there is only one subpicture in each picture of the CLVS.

When res_change_in_clvs_allowed_flag is equal to 1, the value of subpic_info_present_flag shall be equal to 0.
   NOTE 3—When a bitstream is the result of a sub-bitstream extraction process and contains only a subset of the subpictures of the input bitstream to the sub-bitstream extraction process, it might be required to set the value of subpic_info_present_flag equal to 1 in the RBSP of the SPSs.

sps_num_subpics_minus1 plus 1 specifies the number of subpictures in each picture in the CLVS. The value of sps_num_subpics_minus1 shall be in the range of 0 to Ceil(pic_width_max_in_luma_samples÷CtbSizeY)* Ceil (pic_height_max_in_luma_samples÷CtbSizeY)−1, inclusive. When not present, the value of sps_num_subpics_minus1 is inferred to be equal to 0.

sps_independent_subpics_flag equal to 1 specifies that all subpicture boundaries in the CLVS are treated as picture boundaries and there is no loop filtering across the subpicture boundaries. sps_independent_subpics_flag equal to 0 does not impose such a constraint. When not present, the value of sps_independent_subpics_flag is inferred to be equal to _equal to 1_ [[equal to 0]].

7.3.2.4 Picture Parameter Set RBSP Syntax

| pic_parameter_set_rbsp( ) { | Descriptor |
| --- | --- |
| ... | |
| *pps_one_slice_per_picture_flag* | *u(1)* |
| pic_width_in_luma_samples | ue(v) |
| pic_height_in_luma_samples | ue(v) |
| ... | |

| pic_parameter_set_rbsp( ) { | Descriptor |
|---|---|
| subpic_id_mapping_in_pps_flag | u(1) |
| if( subpic_id_mapping_in_pps_flag ) { | |
|    *if( !pps_one_slice_per_picture_flag )* | |
|      *pps_num_subpics_minus1* | ue(v) |
| ... | |
|    if( NumTilesInPic > 1 && *!pps_one_slice_per_picture_flag* ) | |
|      rect_slice_flag | u(1) |
|    if( rect_slice_flag && *!pps_one_slice_per_picture_flag* ) | |
|      single_slice_per_subpic_flag | u(1) |
|    if( rect_slice_flag && !single_slice_per_subpic_flag ) { | |
|      *if( !pps_one_slice_per_picture_flag )* | |
|         num_slices_in_pic_minus1 | ue(v) |
| ... | |
|    loop_filter_across_tiles_enabled_flag | u(1) |
|    *if( !pps_one_slice_per_picture_flag )* | |
|      *loop_filter_across_slices_enabled_flag* | *u(1)* |
| ... | |
| ... | |

7.4.3.4 Picture Parameter Set RBSP Semantics

*pps_one_slice_per_picture_flag shall be equal to sps_one_slice_per_picture_flag* pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When res_change_in_clvs_allowed_flag equal to 0, the value of pic_width_in_luma_samples shall be equal to pic_width_max_in_luma_samples.

When sps_ref_wraparound_enabled_flag is equal to 1, the value of (CtbSizeY/MinCbSizeY+1) shall be less than or equal to the value of (pic_width_in_luma_samples/MinCbSizeY−1).

pps_num_subpics_minus1 shall be equal to sps_num_subpics_minus1. *When pps_one_slice_per_picture_flag is equal to 1 the value of pps_num_subpics_minus1 is inferred to be equal to 0* rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.

single_slice_per_subpic_flag equal to 1 specifies that each subpicture consists of one and only one rectangular slice. single_slice_per_subpic_flag equal to 0 specifies that each subpicture may consist of one or more rectangular slices. When *pps_one_slice_per_picture_flag is equal to 1* [[not present]], the value of single_slice_per_subpic_flag is inferred to be equal to 1.

num_slices_in_pic_minus1 plus 1 specifies the number of rectangular slices in each picture referring to the PPS. The value of num_slices_in_pic_minus1 shall be in the range of 0 to MaxSlicesPerPicture−1, inclusive, where MaxSlicesPerPicture is specified in Annex A. When no_pic_partition_flag is equal to 1, the value of num_slices_in_pic_minus1 is inferred to be equal to 0. When single_slice_per_subpic_flag is equal to 1, the value of num_slices_in_pic_minus1 is inferred to be equal to sps_num_subpics_minus1.

7.4.8.1 General Slice Header Semantics picture_header_in_slice_header_flag equal to 1 specifies that the PH syntax structure is present in the slice header. picture_header_in_slice_header_flag equal to 0 specifies that the PH syntax structure is not present in the slice header.

It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no video coding layer (VCL) NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

*When sps_one_slice_per_picture_flag is equal to 1, the value of picture_header_in_slice_header_flag shall be equal to 1.*

6.3. Third Embodiment

This embodiment corresponds to Example 7 described above.

7.3.2.7 Picture Header Structure Syntax

| picture_header_structure( ) { | Descriptor |
|---|---|
| ... | |
|   if( sps_lmcs_enabled_flag ) { | |
|     [[ph_lmcs_enabled_flag]] *ph_lmcs_mode_idc* | [[u(1)]] *u(2)* |
|     if( [[ph_lmcs_enabled_flag]] *ph_lmcs_mode_idc > 0* ) { | |
|       ph_lmcs_aps_id | u(2) |

-continued

| picture_header_structure( ) { | Descriptor |
|---|---|
|     if( ChromaArrayType != 0 ) | |
|         ph_chroma_residual_scale_flag | u(1) |
|     } | |
|   } | |
| ... | |
| } | |

7.4.3.7 Picture Header Structure Semantics ph_lmcs _mode_idc_[[enabled_flag]] equal to 1 specifies that luma mapping with chroma scaling is applied for all slices associated with the PH. *ph_lmcs_mode_idc equal to 2 specifies that luma mapping with chroma scaling is enabled for the current picture and whether it is applied for each slice is further controlled by the slice_lmcs_ used_flag signalled in the slice header*. ph_lmcs _mode_idc_[[enabled_flag]] equal to 0 specifies that luma mapping with chroma scaling [[may be disabled for one, or more, or]] *is disabled for* all slices associated with the PH. *The value of ph_lmcs_ mode_idc shall be less than 3*. When not present, the value of ph_lmcs_mode_idc_ [[enabled_flag]] is inferred to be equal to 0.

ph_chroma_residual_scale_flag equal to 1 specifies that chroma residual scaling is enabled for all slices associated with the PH *and whether it is applied for each slice is further controlled by the slice_lmcs_used flag signalled in the slice header*. ph_chroma_residual_scale_flag equal to 0 specifies that chroma residual scaling [[may be disabled for one, or more, or]] *is disabled for* all slices associated with the PH. When ph_chroma_residual_scale_flag is not present, it is inferred to be equal to 0.

7.3.7.1 General Slice Header Syntax

| slice_header( ) { | Descriptor |
|---|---|
| ... | |
|     if([[ph_lmcs_enabled flag]] *ph_lmcs_mode_idc == 2* ) | |
|         slice_lmcs_*used_flag*[[enabled_flag]] | u(1) |
|     ... | |
| } | |

7.4.8.1 General Slice Header Semantics slice_lmcs _used_flag_ [[enabled_flag]] equal to 1 specifies that luma mapping with chroma scaling is applied for the current slice, *and, when ph_chroma_residual_ scale_flag is equal to 1, chroma residual scaling is also applied for the current slice*.
slice_lmcs_enabled_flag equal to 0 specifies that luma mapping with chroma scaling as well as chroma residual scaling *as well as chroma residual scaling* is not applied for the current slice. When slice_lmcs_enabled_flag is not present, it is inferred to be equal to [[0]]( *ph_lmcs_mode_idc == 1 ) ? 1 : 0*.

Figure 5:
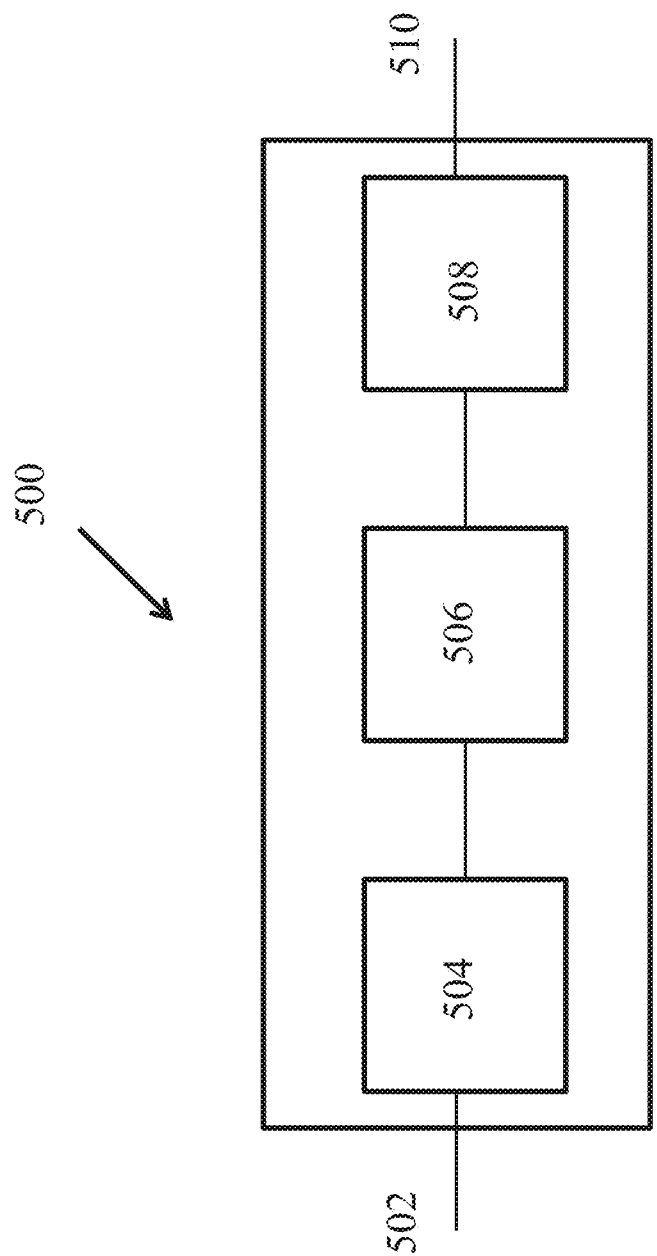
FIG. 5 is a block diagram of an example video processing system in which disclosed techniques may be implemented.

FIG. 5 is a block diagram showing an example video processing system 500 in which various techniques disclosed herein may be implemented. Various implementations may include some or all of the components of the system 500. The system 500 may include input 502 for receiving video content. The video content may be received in a raw or uncompressed format, e.g., 8 or 10 bit multi-component pixel values, or may be in a compressed or encoded format. The input 502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 500 may include a coding component 504 that may implement the various coding or encoding methods described in the present document. The coding component 504 may reduce the average bitrate of video from the input 502 to the output of the coding component 504 to produce a coded representation of the video. The coding techniques are therefore sometimes called video compression or video transcoding techniques. The output of the coding component 504 may be either stored, or transmitted via a communication connected, as represented by the component 506. The stored or communicated bitstream (or coded) representation of the video received at the input 502 may be used by the component 508 for generating pixel values or displayable video that is sent to a display interface 510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 6:
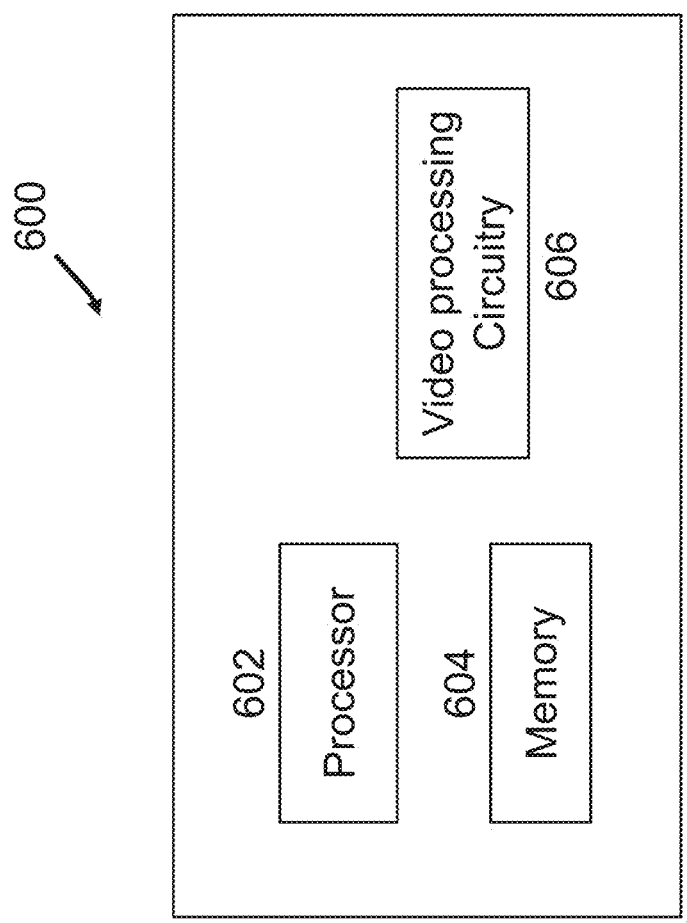
FIG. 6 is a block diagram of an example hardware platform used for video processing.

FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods described in the present document. The memory (memories) 604 may be used for storing data and code used for implementing the methods and techniques described herein. The video processing hardware 606 may be used to implement, in hardware circuitry, some techniques described in the present document. In some embodiments, the hardware 606 may be partly or entirely in the one or more processors 602, e.g., a graphics processor.

Figure 7:
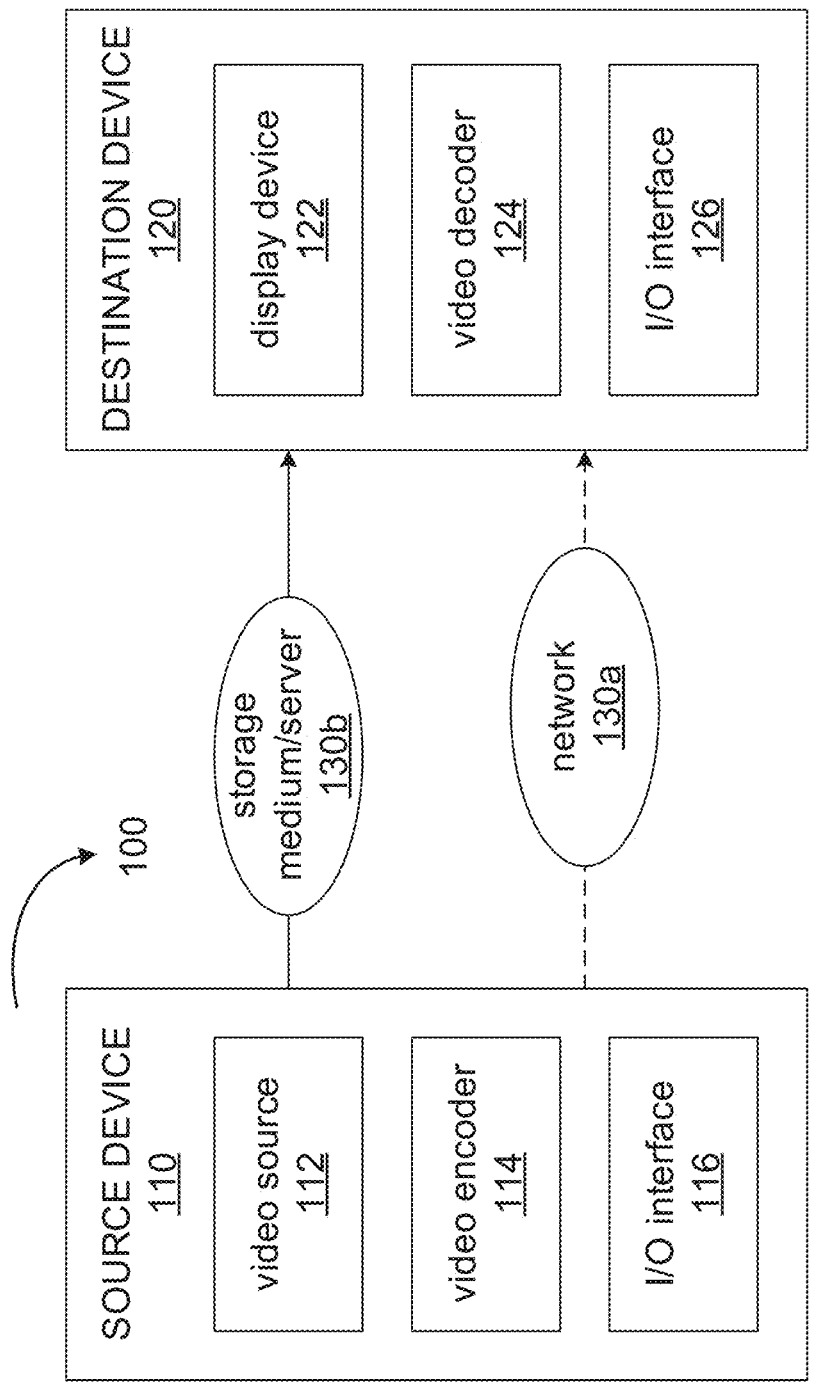
FIG. 7 is a block diagram that illustrates a video coding system in accordance with some embodiments of the present disclosure.

FIG. 7 is a block diagram that illustrates an example video coding system 100 that may utilize the techniques of this disclosure.

As shown in FIG. 7, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding(VVM) standard and other current and/or further standards.

Figure 8:
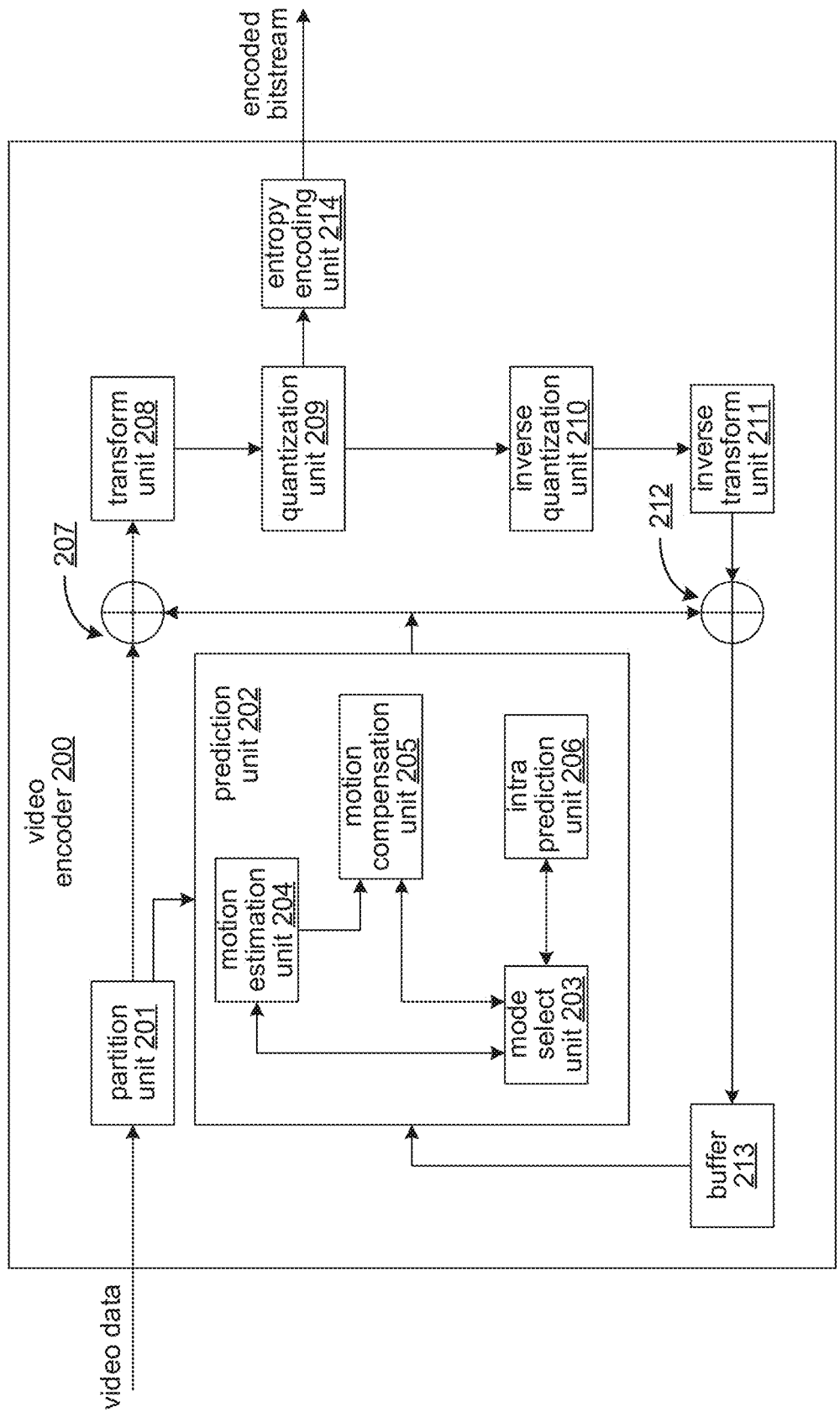
FIG. 8 is a block diagram that illustrates an encoder in accordance with some embodiments of the present disclosure.

FIG. 8 is a block diagram illustrating an example of video encoder 200, which may be video encoder 114 in the system 100 illustrated in FIG. 7.

Video encoder 200 may be configured to perform any or all of the techniques of this disclosure. In the example of FIG. 8, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 8 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 9:
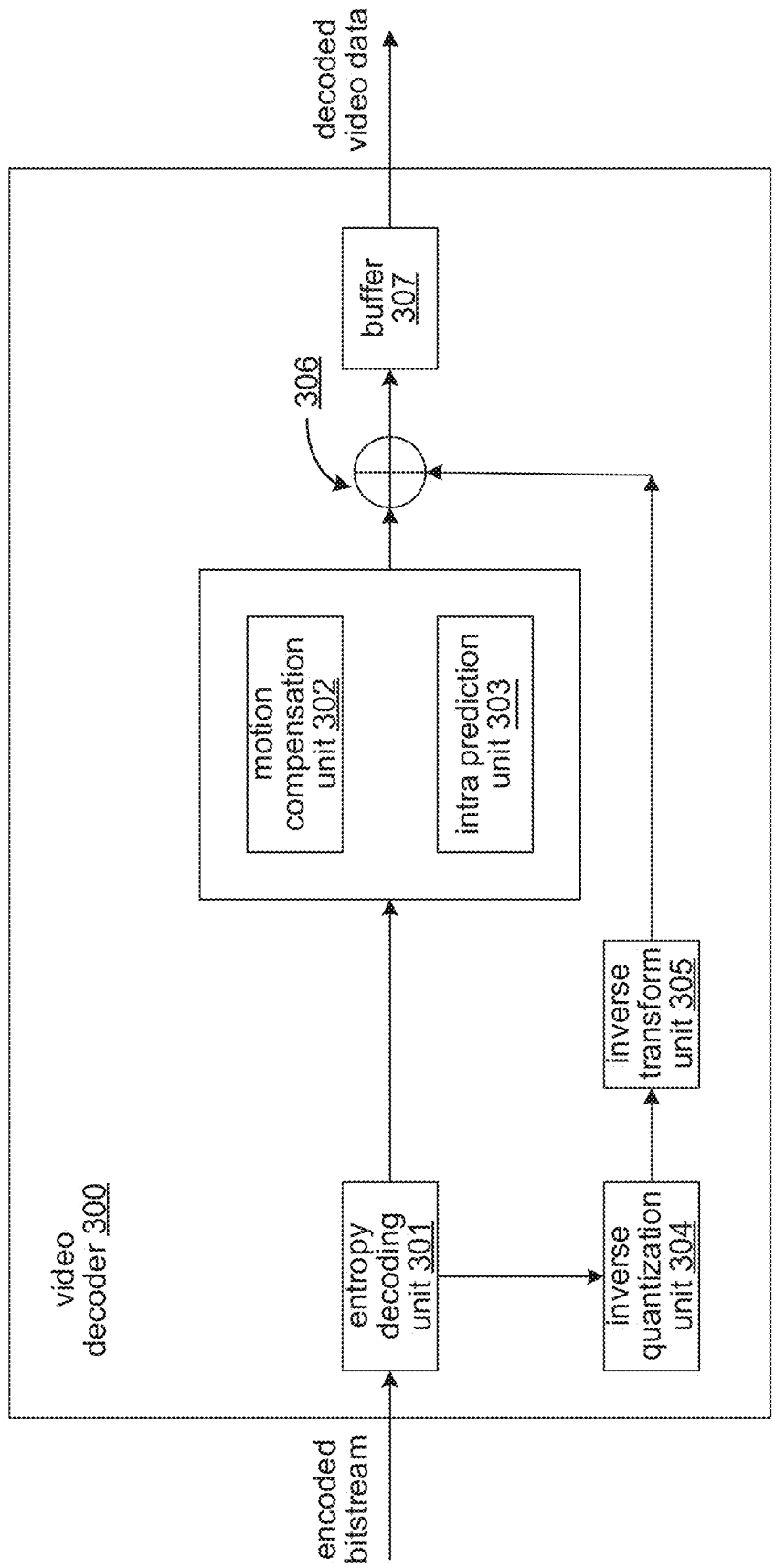
FIG. 9 is a block diagram that illustrates a decoder in accordance with some embodiments of the present disclosure.

FIG. 9 is a block diagram illustrating an example of video decoder 300 which may be video decoder 124 in the system 100 illustrated in FIG. 7.

The video decoder 300 may be configured to perform any or all of the techniques of this disclosure. In the example of FIG. 9, the video decoder 300 includes a plurality of functional components. The techniques described in this disclosure may be shared among the various components of the video decoder 300. In some examples, a processor may be configured to perform any or all of the techniques described in this disclosure.

In the example of FIG. 9, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 8).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

FIGS. 10-17 show example methods that can implement the technical solution described above in, for example, the embodiments show in FIGS. 5-9.

Figure 10:
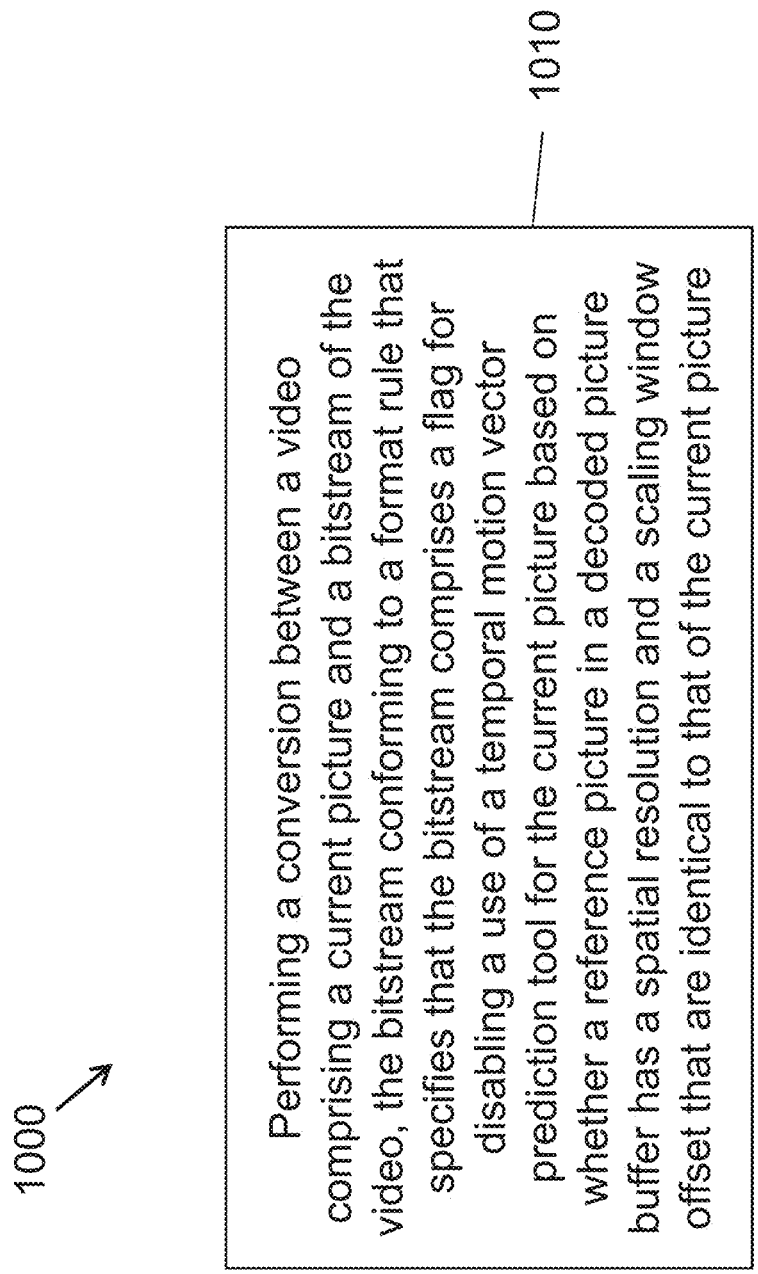

FIG. 10 shows a flowchart for an example method 1000 of video processing. The method 1000 includes, at operation 1010, performing a conversion between a video comprising a current picture and a bitstream of the video, the bitstream conforming to a format rule that specifies that the bitstream comprises a flag for disabling a use of a temporal motion vector prediction tool for the current picture based on whether a reference picture in a decoded picture buffer has a spatial resolution and a scaling window offset that are identical to that of the current picture.

Figure 11:
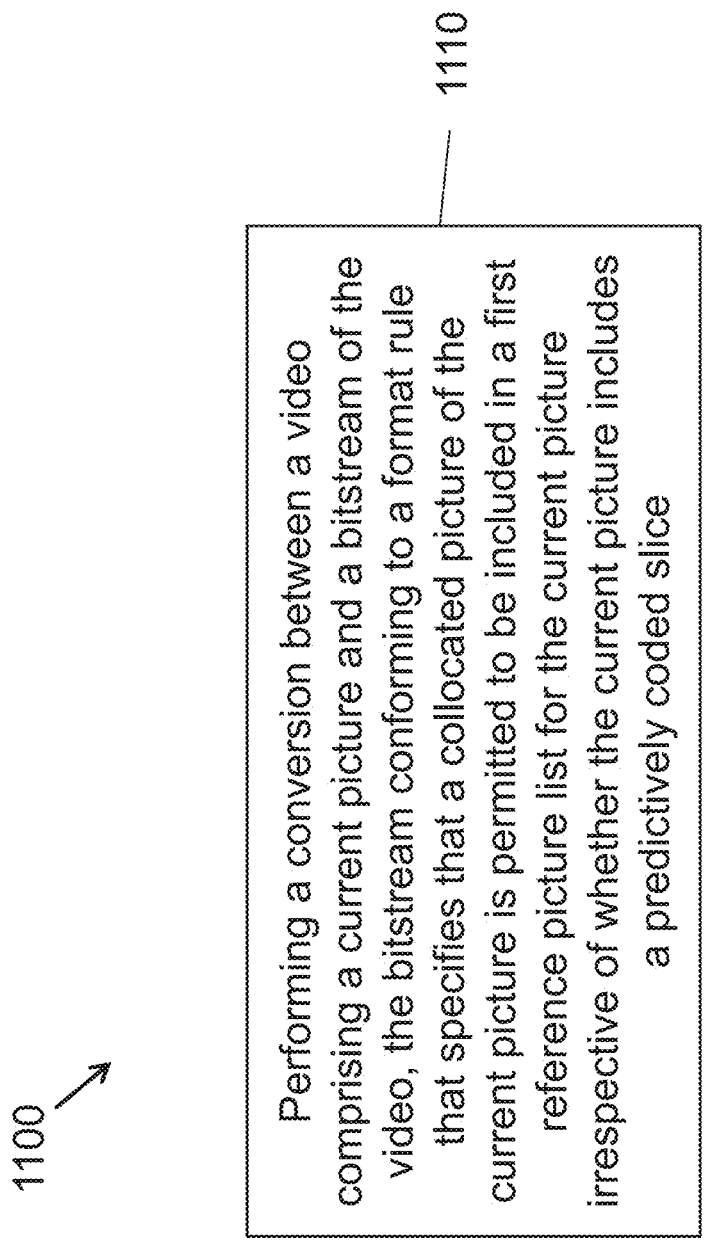

FIG. 11 shows a flowchart for an example method 1100 of video processing. The method 1100 includes, at operation 1110, performing a conversion between a video comprising a current picture and a bitstream of the video, the bitstream conforming to a format rule that specifies that a collocated picture of the current picture is permitted to be included in a first reference picture list for the current picture irrespective of whether the current picture includes a predictively coded slice (P slice).

Figure 12:
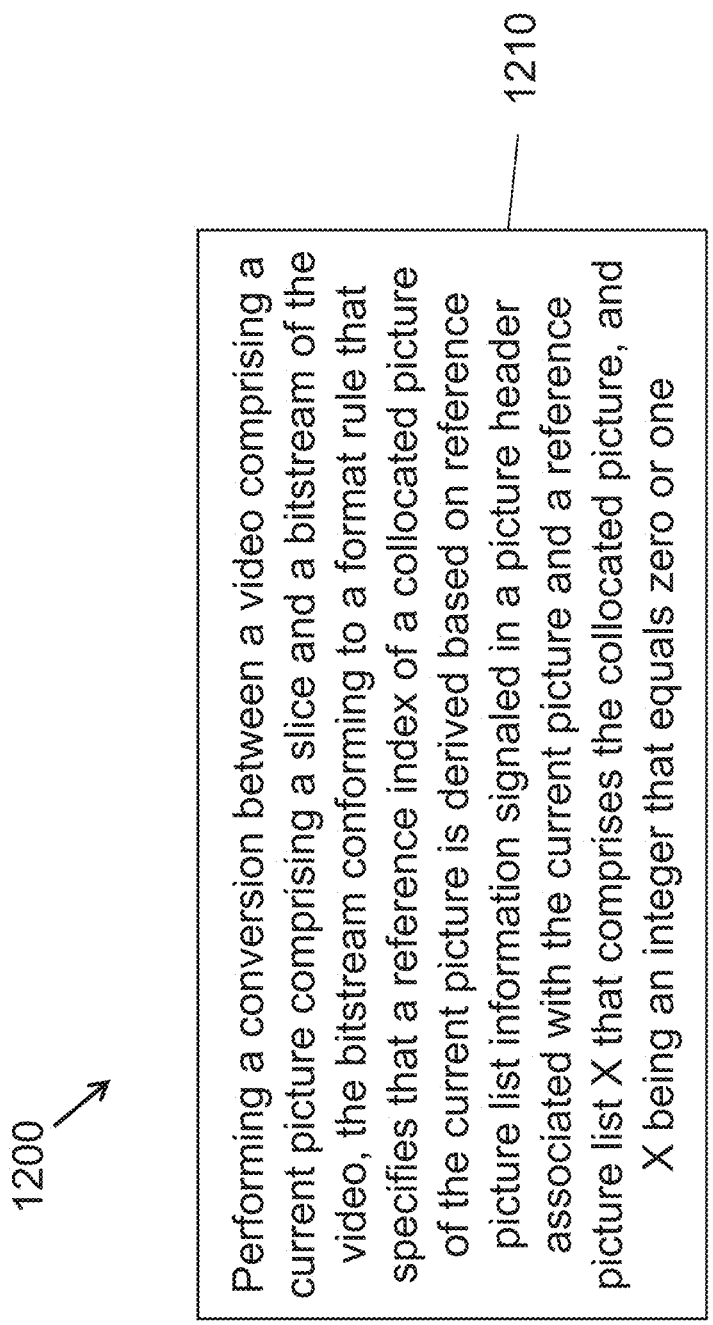

FIG. 12 shows a flowchart for an example method 1200 of video processing. The method 1200 includes, at operation 1210, performing a conversion between a video comprising a current picture comprising a slice and a bitstream of the video, the bitstream conforming to a format rule that specifies that a reference index of a collocated picture of the current picture is derived based on reference picture list information signaled in a picture header associated with the current picture and a reference picture list X that comprises the collocated picture, and X being an integer that equals zero or one.

Figure 13:
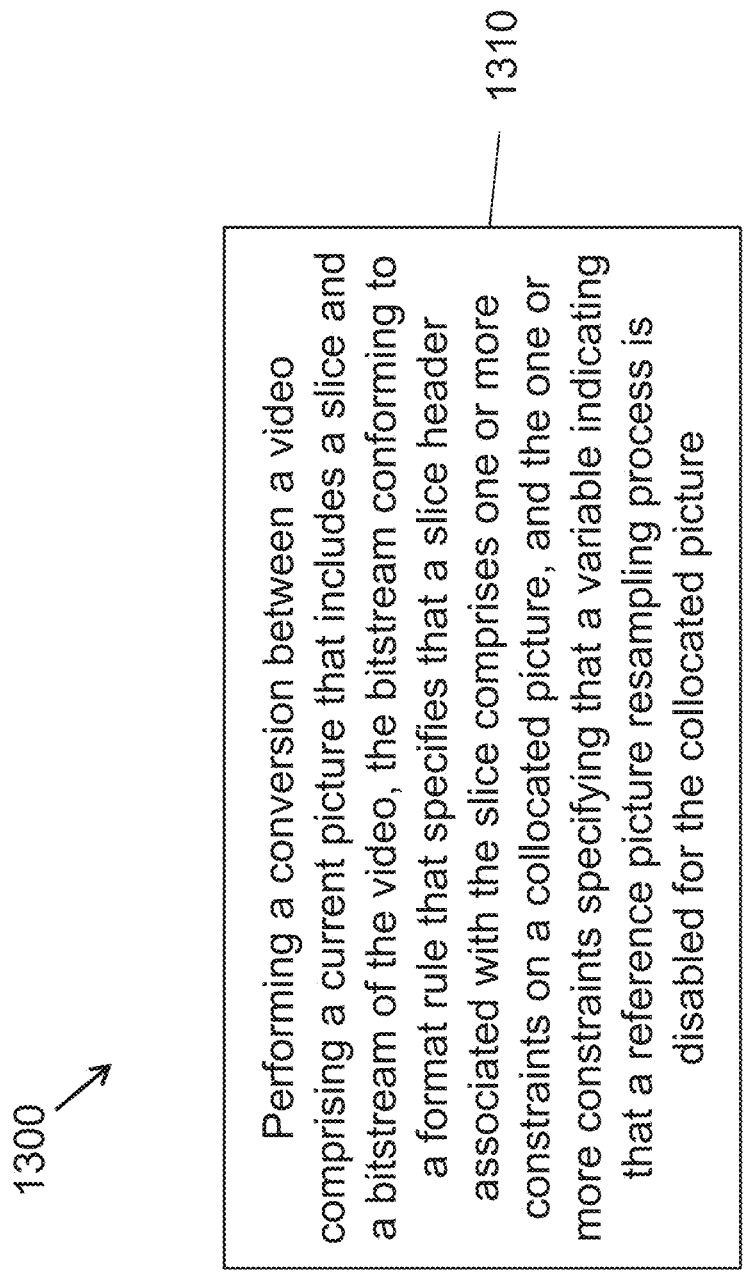

FIG. 13 shows a flowchart for an example method 1300 of video processing. The method 1300 includes, at operation 1310, performing a conversion between a video comprising a current picture that includes a slice and a bitstream of the video, the bitstream conforming to a format rule that specifies that a slice header associated with the slice comprises one or more constraints on a collocated picture, and the one or more constraints specifying that a variable indicating that a reference picture resampling process is disabled for the collocated picture.

Figure 14:
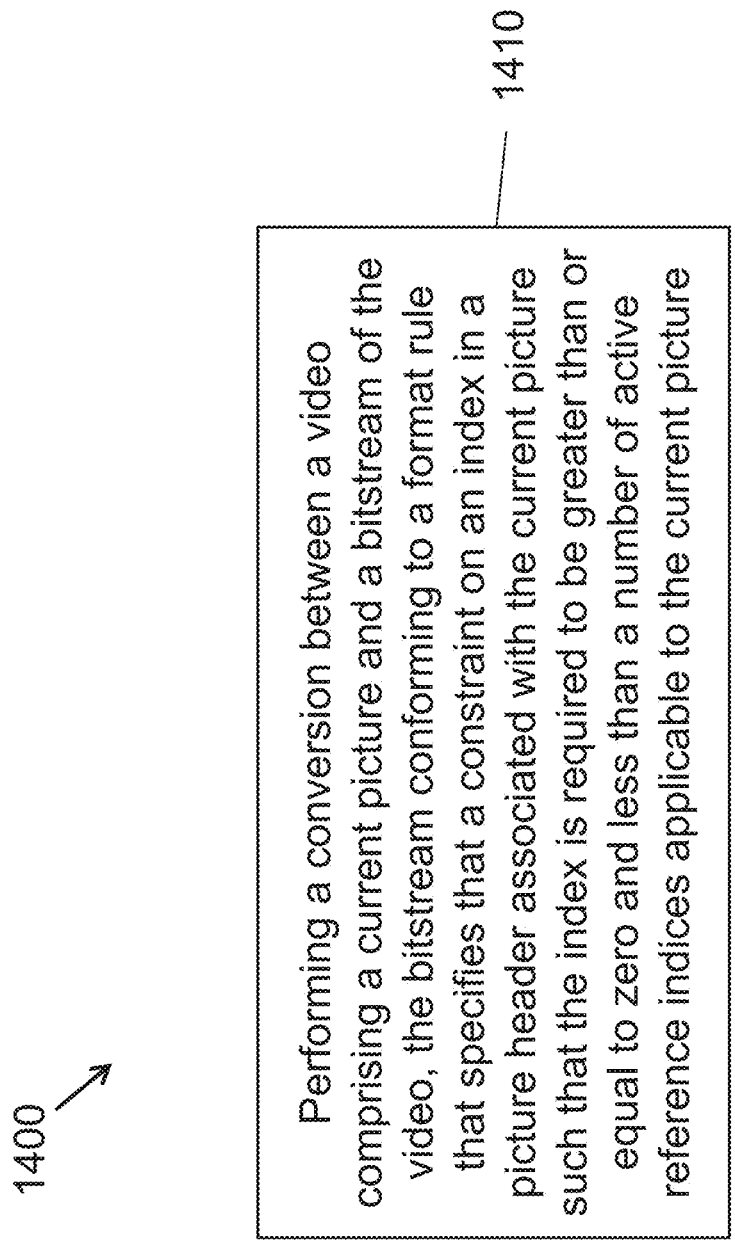

FIG. 14 shows a flowchart for an example method 1400 of video processing. The method 1400 includes, at operation 1410, performing a conversion between a video comprising a current picture and a bitstream of the video, the bitstream conforming to a format rule that specifies that a constraint on an index in a picture header associated with the current picture such that the index is required to be greater than or equal to zero and less than a number of active reference indices applicable to the current picture.

FIG. 15 shows a flowchart for an example method 1500 of video processing. The method 1500 includes, at operation 1510, performing a conversion between a video and a bitstream of the video according to a rule, the rule specifying that a flag is included in a sequence parameter set at a position prior to a first syntax element that indicates a number of subpictures included in pictures referring to the sequence parameter set, and a specific value of the flag indicating that the pictures include exactly one slice.

Figure 16:
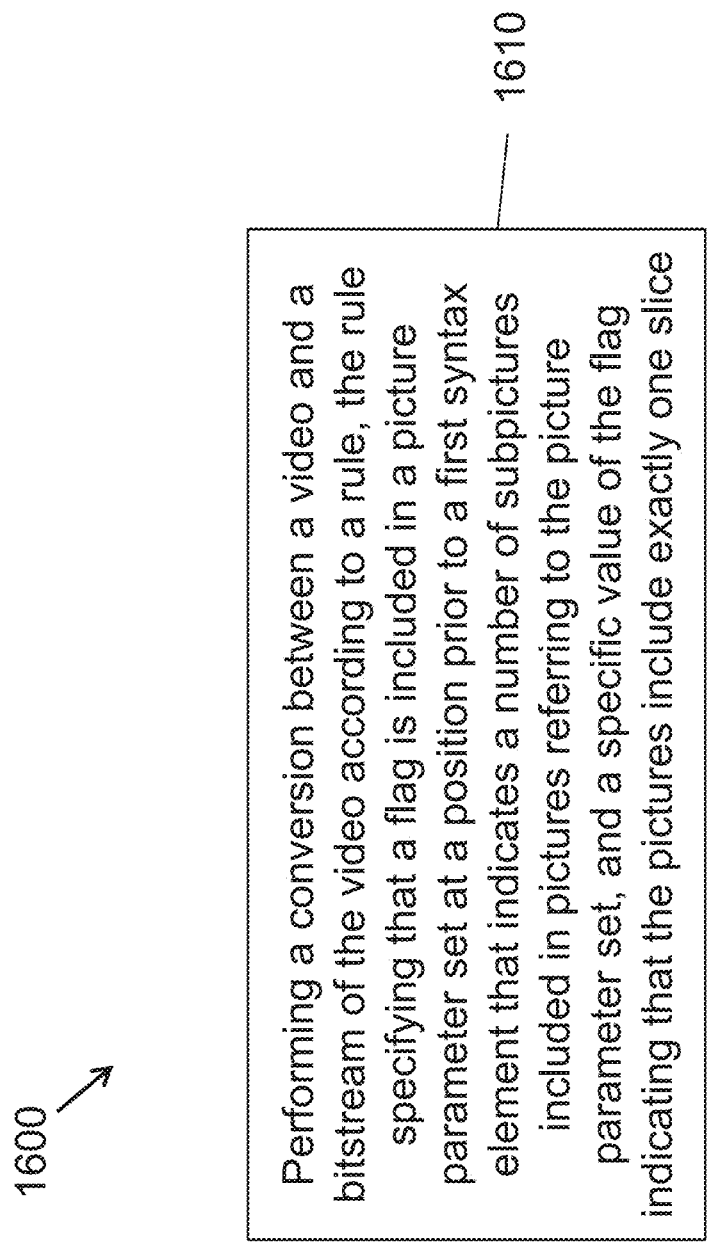

FIG. 16 shows a flowchart for an example method 1600 of video processing. The method 1600 includes, at operation 1610, performing a conversion between a video and a bitstream of the video according to a rule, the rule specifying that a flag is included in a picture parameter set at a position prior to a first syntax element that indicates a number of subpictures included in pictures referring to the picture parameter set, and a specific value of the flag indicating that the pictures include exactly one slice.

Figure 17:
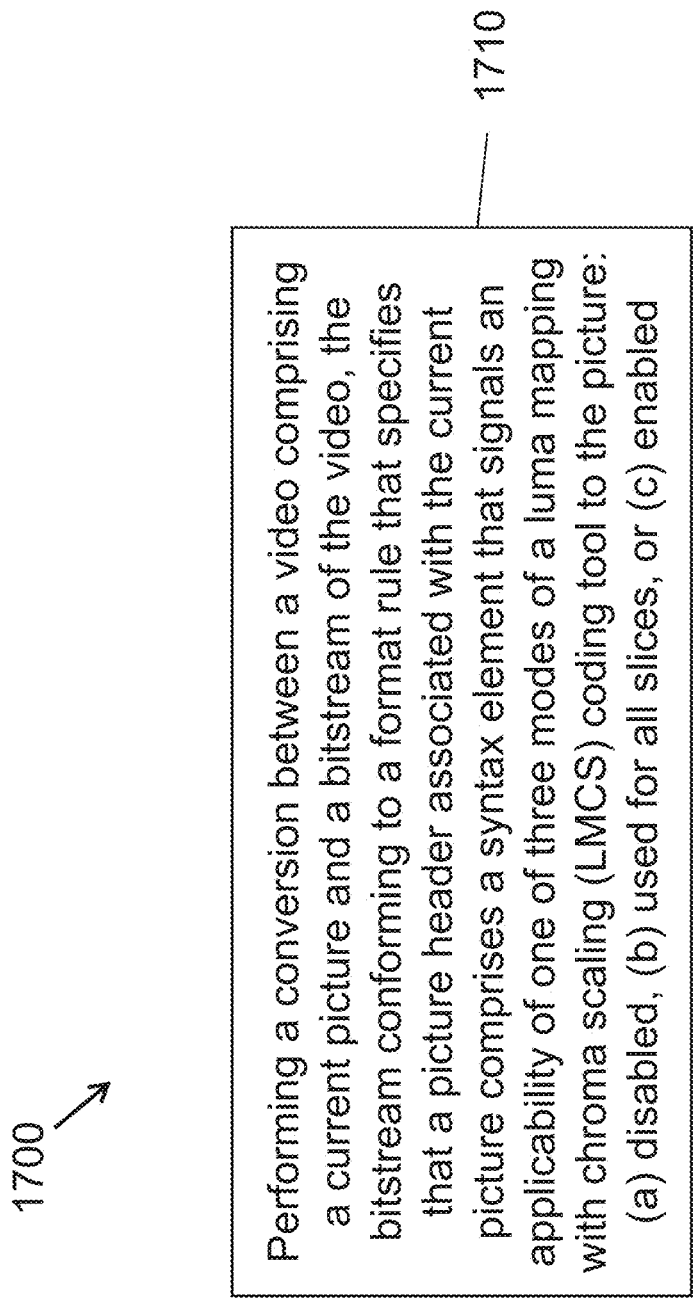

FIG. 17 shows a flowchart for an example method 1700 of video processing. The method 1700 includes, at operation 1710, performing a conversion between a video comprising a current picture and a bitstream of the video, the bitstream conforming to a format rule that specifies that a picture header associated with the current picture comprises a syntax element that signals an applicability of one of three modes of a luma mapping with chroma scaling (LMCS) coding tool to the picture: (a) disabled, (b) used for all slices, or (c) enabled.

A listing of solutions preferred by some embodiments is provided next.

A1. A method of video processing, comprising performing a conversion between a video comprising a current picture and a bitstream of the video, wherein the bitstream conforms to a format rule, and wherein the format rule specifies that the bitstream comprises a flag for disabling a use of a temporal motion vector prediction tool for the current picture based on whether a reference picture in a decoded picture buffer has a spatial resolution and a scaling window offset that are identical to that of the current picture.

A2. The method of solution A1, wherein the flag equals zero due to no reference picture in the decoded picture buffer having the same spatial resolution and the same scaling window offset as that of the current picture.

A3. The method of solution A1, wherein the flag equals zero due to no reference picture in the decoded picture buffer being in an active entry of one or more reference picture lists of all slices in the current picture.

A4. The method of solution A2 or A3, wherein the flag equaling zero indicates the temporal motion vector prediction tool is disabled for the current picture.

A5. The method of any of solutions A1 to A4, wherein the flag is included in a picture header.

A6. The method of solution A5, wherein the flag is ph_temporal_mvp_enabled_flag.

A7. A method of video processing, comprising performing a conversion between a video comprising a current picture and a bitstream of the video, wherein the bitstream conforms to a format rule, and wherein the format rule specifies that a collocated picture of the current picture is permitted to be included in a first reference picture list for the current picture irrespective of whether the current picture includes a predictively coded slice (P slice).

A8. The method of solution A7, wherein the format rule further specifies that the collocated picture is not present in a second reference picture list for the current picture.

A9. The method of solution A8, wherein the first reference picture list is RefPicList[1] and the second reference picture list is RefPicList[0].

A10. A method of video processing, comprising performing a conversion between a video comprising a current picture comprising a slice and a bitstream of the video, wherein the bitstream conforms to a format rule, wherein the format rule specifies that a reference index of a collocated picture of the current picture is derived based on reference picture list information signaled in a picture header associated with the current picture and a reference picture list X that comprises the collocated picture, and wherein X is an integer that equals zero or one.

A11. The method of solution A10, wherein the reference index of the collocated picture is derived as a minimum of (a) a collocated picture reference index in the picture header and (b) a number of active entries in a reference picture list (1−X) minus one.

A12. The method of solution A10, wherein the reference index of the collocated picture is derived as (a) a collocated picture reference index in the picture header when the collocated picture reference index is less than a number of active entries in a reference picture list (1−X) or (b) a predetermined non-negative integer (N) that spans a range from zero to the number of active entries in the reference picture list (1−X) minus one.

A13. The method of solution A12, wherein N=0.

A14. The method of any of solutions A1 to A13, wherein the conversion comprises decoding the video from the bitstream.

A15. The method of any of solutions A1 to A13, wherein the conversion comprises encoding the video into the bitstream.

A16. A method of storing a bitstream representing a video to a computer-readable recording medium, comprising generating the bitstream from the video according to a method described in any one or more of solutions A1 to A13, and storing the bitstream in the computer-readable recording medium.

A17. A video processing apparatus comprising a processor configured to implement a method recited in any one or more of solutions A1 to A16.

A18. A computer-readable medium having instructions stored thereon, the instructions, when executed, causing a processor to implement a method recited in one or more of solutions A1 to A16.

A19. A computer readable medium that stores the bitstream generated according to any one or more of solutions A1 to A16.

A20. A video processing apparatus for storing a bitstream, wherein the video processing apparatus is configured to implement a method recited in any one or more of solutions A1 to A16.

Another listing of solutions preferred by some embodiments is provided next.

B1. A method of video processing, comprising performing a conversion between a video comprising a current picture that includes a slice and a bitstream of the video, wherein the bitstream conforms to a format rule that specifies that a slice header associated with the slice comprises one or more constraints on a collocated picture, and wherein the one or more constraints specifies that a variable indicating that a reference picture resampling process is disabled for the collocated picture.

B2. The method of solution B1, wherein the variable is RprConstraintsActiveFlag, and wherein the variable having a value of zero indicates that reference picture resampling process is disabled for the collocated picture.

B3. The method of solution B1, wherein the one or more constraints further specifies that a number of subpictures and a coding tree unit (CTU) size of the collocated picture are identical to that of the current picture.

B4. The method of any of solutions B1 to B3, wherein the collocated picture is used in a temporal motion vector prediction tool that is enabled for the current picture.

B5. A method of video processing, comprising performing a conversion between a video comprising a current picture and a bitstream of the video, wherein the bitstream conforms to a format rule, and wherein the format rule specifies that a constraint on an index in a picture header associated with the current picture such that the index is required to be greater than or equal to zero and less than a number of active reference indices applicable to the current picture.

B6. The method of solution B5, wherein the index indicates a collocated picture used for a temporal motion vector prediction of the current picture.

B7. The method of solution B5 or B6, wherein the active reference indices correspond to reference indices for reference picture list 0.

B8. The method of solution B5 or B6, wherein the active reference indices correspond to reference indices for reference picture list 1.

B9. A method of video processing, comprising performing a conversion between a video and a bitstream of the video according to a rule, wherein the rule specifies that a flag is included in a sequence parameter set at a position prior to a first syntax element that indicates a number of subpictures included in pictures referring to the sequence parameter set, and wherein a specific value of the flag indicates that the pictures include exactly one slice.

B10. The method of solution B9, wherein the flag is sps_one_slice_per_picture_flag and the first syntax element is sps_num_subpics_minus1.

B11. The method of solution B9 or B10, wherein the format rule further specifies that the first syntax element or a second syntax element is excluded from the sequence parameter set due to an inclusion of the flag.

B12. The method of solution B9 or B10, wherein the format rule further specifies that the first syntax element or a second syntax element is inferred to have a specific value due to an inclusion of the flag.

B13. The method of solution B11 or B12, wherein the second syntax element is sps_independent_subpics_flag.

B14. The method of solution B12, wherein the second syntax element is picture_header_in_slice_header_flag.

B15. A method of video processing, comprising performing a conversion between a video and a bitstream of the video according to a rule, wherein the rule specifies that a flag is included in a picture parameter set at a position prior to a first syntax element that indicates a number of subpictures included in pictures referring to the picture parameter set, and wherein a specific value of the flag indicates that the pictures include exactly one slice.

B16. The method of solution B15, wherein the flag is pps_one_slice_per_picture_flag and the first syntax element is pps_num_subpics_minus1.

B17. The method of solution B15 or B16, wherein the format rule further specifies that the first syntax element or a second syntax element is excluded from the picture parameter set due to an inclusion of the flag.

B18. The method of solution B15 or B16, wherein the format rule further specifies that the first syntax element or a second syntax element is inferred to have a specific value due to an inclusion of the flag.

B19. The method of solution B18, wherein the second syntax element is rect_slice_flag, num_slices_in_pic_minus1, loop_filter_across_slices_enabled_flag, or single_slice_per_subpic_flag.

B20. A method of video processing, comprising performing a conversion between a video comprising a current picture and a bitstream of the video, wherein the bitstream conforms to a format rule, and wherein the format rule specifies that a picture header associated with the current picture comprises a syntax element that signals an applicability of one of three modes of a luma mapping with chroma scaling (LMCS) coding tool to the picture (a) disabled, (b) used for all slices, or (c) enabled.

B21. The method of any of solutions B1 to B20, wherein the conversion comprises decoding the video from the bitstream.

B22. The method of any of solutions B1 to B20, wherein the conversion comprises encoding the video into the bitstream.

B23. A method of storing a bitstream representing a video to a computer-readable recording medium, comprising generating the bitstream from the video according to a method described in any one or more of solutions B1 to B20; and storing the bitstream in the computer-readable recording medium.

B24. A video processing apparatus comprising a processor configured to implement a method recited in any one or more of solutions B1 to B23.

B25. A computer-readable medium having instructions stored thereon, the instructions, when executed, causing a processor to implement a method recited in one or more of solutions B1 to B23.

B26. A computer readable medium that stores the bitstream generated according to any one or more of solutions B1 to B23.

B27. A video processing apparatus for storing a bitstream, wherein the video processing apparatus is configured to implement a method recited in any one or more of solutions B1 to B23.

Yet another listing of solutions preferred by some embodiments is provided next.

P1. A video processing method, comprising performing a conversion between a video comprising multiple video layers comprising one or more pictures and a coded representation of the video, wherein the coded representation conforms to a format rule defines use of a collocated picture of a video picture from a first reference picture list or a second reference picture list for a predictively coded slice (P slice) is included in the current picture.

P2. The method of solution P1, wherein the format rule further specifies that the P slice is coded using the first reference picture list and conditionally using the second reference picture list.

P3. A video processing method, comprising performing a conversion between a video comprising multiple video layers comprising one or more pictures and a coded representation of the video, wherein the coded representation conforms to a format rule that specifies that a flag included in the coded representation for disabling use of a temporal motion vector prediction tool for a current picture in one layer due to no reference pictures in a decoded picture buffer having a same spatial resolution and scaling window offsets as that of the current picture.

P4. A video processing method, comprising performing a conversion between a video comprising multiple video layers comprising one or more pictures and a coded representation of the video, wherein the coded representation conforms to a format rule that specifies a constraint on an index in a picture header of a current picture such that the index is required to be less than a value of a number of active reference indexes applicable to the current picture.

P5. A video processing method, comprising performing a conversion between a video comprising multiple video layers comprising one or more pictures and a coded representation of the video, wherein the coded representation conforms to a format rule that specifies to include a flag in a sequence parameter set, wherein the flag is included at a position prior to a field that indicates a number of subpictures included in referring pictures, such that a specific value of the flag indicates that the referring pictures comprises exactly one slice.

P6. The method of solution P5, wherein the format rule further specifies to omit the field from the sequence parameter set due to inclusion of the flag.

P7. The method of solution P5, wherein the format rule further specifies to signal a specific value in the field from the sequence parameter set due to inclusion of the flag.

P8. A video processing method, comprising performing a conversion between a video comprising multiple video layers comprising one or more pictures and a coded representation of the video, wherein the coded representation conforms to a format rule that specifies to include a flag in a picture parameter set, wherein the flag is included at a position prior to a field that indicates a number of subpictures included in referring pictures, such that a specific value of the flag indicates that the referring pictures comprises exactly one slice.

P9. The method of solution P8, wherein the format rule further specifies to omit the field from the picture parameter set due to inclusion of the flag.

P10. The method of solution P8, wherein the format rule further specifies to signal a specific value in the field from the picture parameter set due to inclusion of the flag.

P11. A video processing method, comprising performing a conversion between a video comprising multiple video layers comprising one or more pictures and a coded representation of the video, wherein the coded representation conforms to a format rule that specifies to include a syntax element in a picture header of a picture, wherein the syntax element signals applicability of one of three modes of luma mapping with chroma scaling (LMCS) coding tool to the picture (a) disabled, (b) used for all slices, or (c) enabled.

P12. The method of any of solutions P1 to P11, wherein the conversion comprises encoding the video into the coded representation.

P13. The method of any of solutions P1 to P11, wherein the conversion comprises decoding the coded representation to generate pixel values of the video.

P14. A video decoding apparatus comprising a processor configured to implement a method recited in one or more of solutions P1 to P13.

P15. A video encoding apparatus comprising a processor configured to implement a method recited in one or more of solutions P1 to P13.

P16. A computer program product having computer code stored thereon, the code, when executed by a processor, causes the processor to implement a method recited in any of solutions P1 to P13.

P17. A method, apparatus or system described in the present document.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   performing a conversion between a video comprising a current picture and a bitstream of the video,
   wherein the bitstream conforms to a format rule, and
   wherein the format rule specifies that the bitstream comprises a flag for disabling a use of a temporal motion vector prediction tool for the current picture based on whether a reference picture in a decoded picture buffer has a spatial resolution and scaling window offsets that are identical to that of the current picture.

2. The method of claim 1, wherein the flag equals zero when no reference picture in the decoded picture buffer has a same spatial resolution and a same scaling window offsets as that of the current picture.

3. The method of claim 1, wherein the flag equals zero when no reference picture in the decoded picture buffer is in an active entry of one or more reference picture lists of all slices in the current picture.

4. The method of claim 1, wherein the flag is included in a picture header.

5. The method of claim 4, wherein the flag is ph_temporal_mvp_enabled_flag.

6. The method of claim 1, wherein the format rule specifies that a slice header associated with a slice of the current picture comprises one or more constraints on a collocated picture of the current picture, and wherein the one or more constraints specifies that a variable indicating that a reference picture resampling process is disabled for the collocated picture.

7. The method of claim 6, wherein the variable is RprConstraintsActiveFlag, and wherein the variable having a value of zero indicates that the reference picture resampling process is disabled for the collocated picture.

8. The method of claim 6, wherein the one or more constraints further specifies that a number of subpictures and a coding tree unit (CTU) size of the collocated picture are identical to that of the current picture.

9. The method of claim 1, wherein a collocated picture is used in the temporal motion vector prediction tool.

10. The method of claim 1, wherein the conversion comprises decoding the video from the bitstream.

11. The method of claim 1, wherein the conversion comprises encoding the video into the bitstream.

12. An apparatus for processing video data comprising a processor and a non-transitory memory with instructions thereon, wherein the instructions upon execution by the processor, cause the processor to:
perform a conversion between a video comprising a current picture and a bitstream of the video,
wherein the bitstream conforms to a format rule, and
wherein the format rule specifies that the bitstream comprises a flag for disabling a use of a temporal motion vector prediction tool for the current picture based on whether a reference picture in a decoded picture buffer has a spatial resolution and scaling window offsets that are identical to that of the current picture.

13. The apparatus of claim 12, wherein the flag equals zero when no reference picture in the decoded picture buffer has a same spatial resolution and a same scaling window offsets as that of the current picture, or
wherein the flag equals zero when no reference picture in the decoded picture buffer is in an active entry of one or more reference picture lists of all slices in the current picture.

14. The apparatus of claim 12, wherein the flag is included in a picture header, and wherein the flag is ph_temporal_mvp_enabled_flag.

15. The apparatus of claim 12, wherein the format rule specifies that a slice header associated with a slice of the current picture comprises one or more constraints on a collocated picture of the current picture,
wherein the one or more constraints specifies that a variable indicating that a reference picture resampling process is disabled for the collocated picture,
wherein the variable is RprConstraintsActiveFlag, and wherein the variable having a value of zero indicates that the reference picture resampling process is disabled for the collocated picture, and
wherein the one or more constraints further specifies that a number of subpictures and a coding tree unit (CTU) size of the collocated picture are identical to that of the current picture.

16. The apparatus of claim 12, wherein a collocated picture is used in the temporal motion vector prediction tool.

17. A non-transitory computer-readable storage medium storing instructions that cause a processor to:
perform a conversion between a video comprising a current picture and a bitstream of the video,
wherein the bitstream conforms to a format rule, and
wherein the format rule specifies that the bitstream comprises a flag for disabling a use of a temporal motion vector prediction tool for the current picture based on whether a reference picture in a decoded picture buffer has a spatial resolution and scaling window offsets that are identical to that of the current picture.

18. The non-transitory computer-readable storage medium of claim 17, wherein the flag equals zero when no reference picture in the decoded picture buffer has a same spatial resolution and a same scaling window offsets as that of the current picture, or
wherein the flag equals zero when no reference picture in the decoded picture buffer is in an active entry of one or more reference picture lists of all slices in the current picture,
wherein the flag is included in a picture header,
wherein the flag is ph_temporal_mvp_enabled_flag,
wherein the format rule specifies that a slice header associated with a slice of the current picture comprises one or more constraints on a collocated picture of the current picture,
wherein the one or more constraints specifies that a variable indicating that a reference picture resampling process is disabled for the collocated picture,
wherein the variable is RprConstraintsActiveFlag, and wherein the variable having a value of zero indicates that the reference picture resampling process is disabled for the collocated picture, and
wherein the one or more constraints further specifies that a number of subpictures and a coding tree unit (CTU) size of the collocated picture are identical to that of the current picture,
wherein the collocated picture is used in the temporal motion vector prediction tool.

19. A non-transitory computer-readable recording medium storing a bitstream of a video which is generated by a method performed by a video processing apparatus, wherein the method comprises:
generating the bitstream of the video comprising a current picture,
wherein the bitstream conforms to a format rule, and
wherein the format rule specifies that the bitstream comprises a flag for disabling a use of a temporal motion vector prediction tool for the current picture based on whether a reference picture in a decoded picture buffer has a spatial resolution and scaling window offsets that are identical to that of the current picture.

20. The non-transitory computer-readable recording medium of claim 19, wherein the flag equals zero when no reference picture in the decoded picture buffer has a same spatial resolution and a same scaling window offsets as that of the current picture, or
wherein the flag equals zero when no reference picture in the decoded picture buffer is in an active entry of one or more reference picture lists of all slices in the current picture,
wherein the flag is included in a picture header,
wherein the flag is ph_temporal_mvp_enabled_flag,
wherein the format rule specifies that a slice header associated with a slice of the current picture comprises one or more constraints on a collocated picture of the current picture,
wherein the one or more constraints specifies that a variable indicating that a reference picture resampling process is disabled for the collocated picture,
wherein the variable is RprConstraintsActiveFlag,
wherein the variable having a value of zero indicates that the reference picture resampling process is disabled for the collocated picture, wherein the one or more constraints further specifies that a number of subpictures and a coding tree unit (CTU) size of the collocated picture are identical to that of the current picture, and wherein the collocated picture is used in the temporal motion vector prediction tool.

\* \* \* \* \*